(12) United States Patent
Hayashi et al.

(10) Patent No.: US 11,931,891 B2
(45) Date of Patent: Mar. 19, 2024

(54) ROBOT HAVING FLEXIBLE OUTER SKIN

(71) Applicant: GROOVE X, Inc., Tokyo (JP)

(72) Inventors: Kaname Hayashi, Tokyo (JP); Daijiro Kato, Tokyo (JP); Tomoaki Yokoyama, Tokyo (JP)

(73) Assignee: GROOVE X, INC., Tokyo (JP)

( * ) Notice: Subject to any disclaimer, the term of this patent is extended or adjusted under 35 U.S.C. 154(b) by 719 days.

(21) Appl. No.: 17/096,970

(22) Filed: Nov. 13, 2020

(65) Prior Publication Data

US 2021/0069893 A1 Mar. 11, 2021

Related U.S. Application Data

(63) Continuation of application No. PCT/JP2019/019243, filed on May 15, 2019.

(30) Foreign Application Priority Data

May 15, 2018 (JP) ................. 2018-093430

(51) Int. Cl.
*B25J 9/00* (2006.01)
*B25J 11/00* (2006.01)

(52) U.S. Cl.
CPC ........... *B25J 9/0009* (2013.01); *B25J 9/0003* (2013.01); *B25J 11/003* (2013.01)

(58) Field of Classification Search
CPC ....... B25J 9/0009; B25J 9/0003; B25J 11/003
See application file for complete search history.

(56) References Cited

U.S. PATENT DOCUMENTS

| 4,307,891 A | 12/1981 | Doornick et al. |
| 6,565,371 B1 | 5/2003 | Watanabe |
| 6,843,703 B1 * | 1/2005 | Iaconis ................. A63H 13/02 446/376 |
| 2019/0181666 A1 | 6/2019 | Hayashi |
| 2020/0030707 A1 | 1/2020 | Hayashi et al. |

FOREIGN PATENT DOCUMENTS

| CN | 102500113 A | 6/2012 |
| CN | 207139820 U | 3/2018 |
| JP | 2000323219 A | 11/2000 |
| WO | 2018052001 A1 | 3/2018 |
| WO | 2018190251 A1 | 10/2018 |

OTHER PUBLICATIONS

Office Action in CN Application No. 201980031191.9 dated Feb. 9, 2023. 12pp.
International Search Report in PCT/JP2019/019243, dated Jul. 30, 2019. 2pp.

* cited by examiner

*Primary Examiner* — Nicholas Kiswanto
*Assistant Examiner* — Jamal A Shah
(74) *Attorney, Agent, or Firm* — HAUPTMAN HAM, LLP

(57) ABSTRACT

A robot includes a trunk portion frame (functioning as a "base portion"), a head portion frame (functioning as a "first movable portion") supported by the trunk portion frame, a flexible outer skin provided in such a way as to come into contact with the head portion frame and cover the trunk portion frame, and a pair of arm portions (functioning as a "second movable portion"), provided in contact with the outer skin, whose relative displacement with respect to the trunk portion frame changes in accompaniment to a displacement of the outer skin that accords with an operation of the head portion frame.

20 Claims, 17 Drawing Sheets

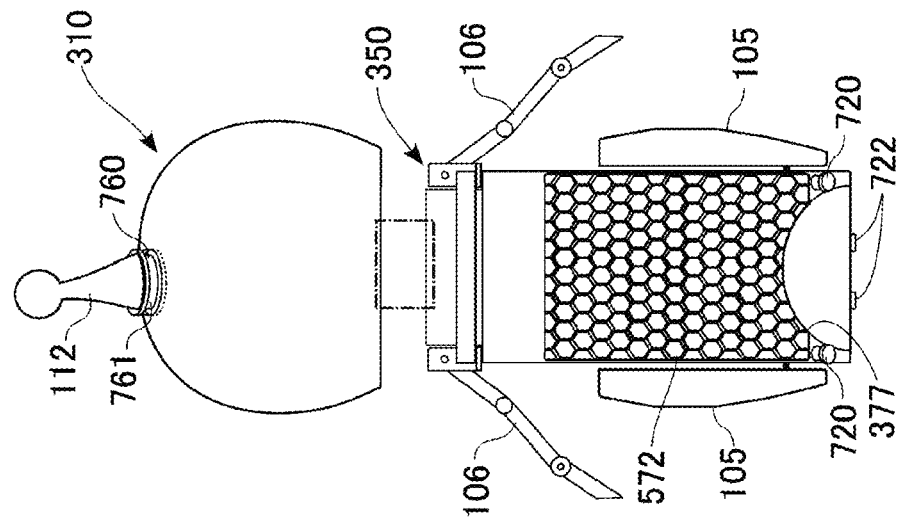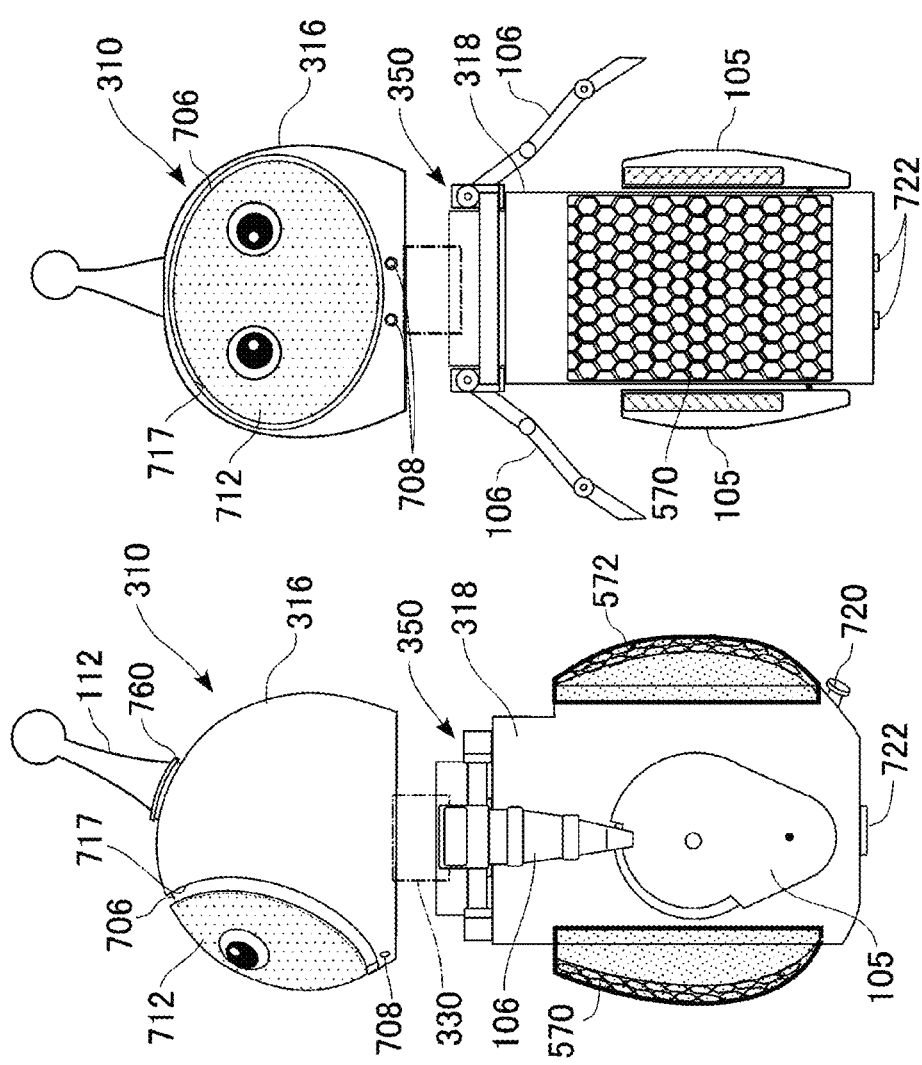

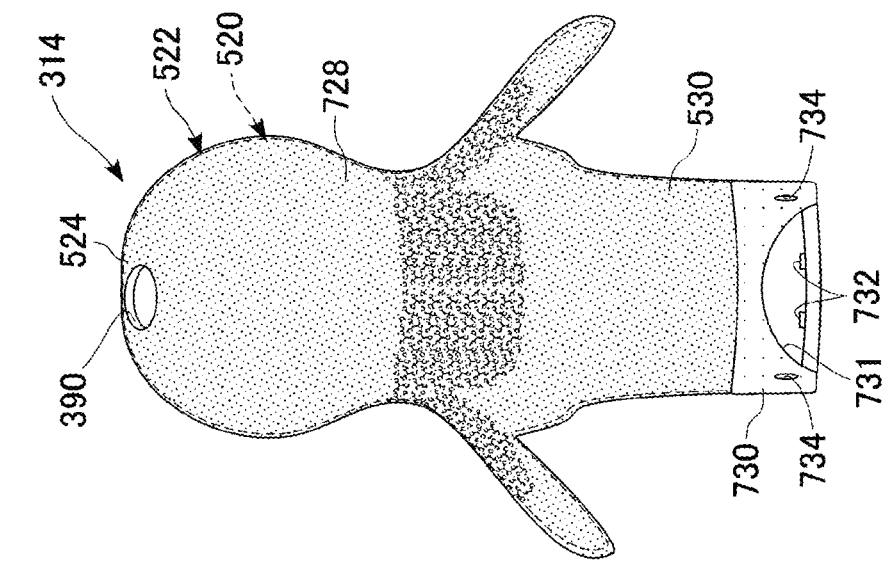
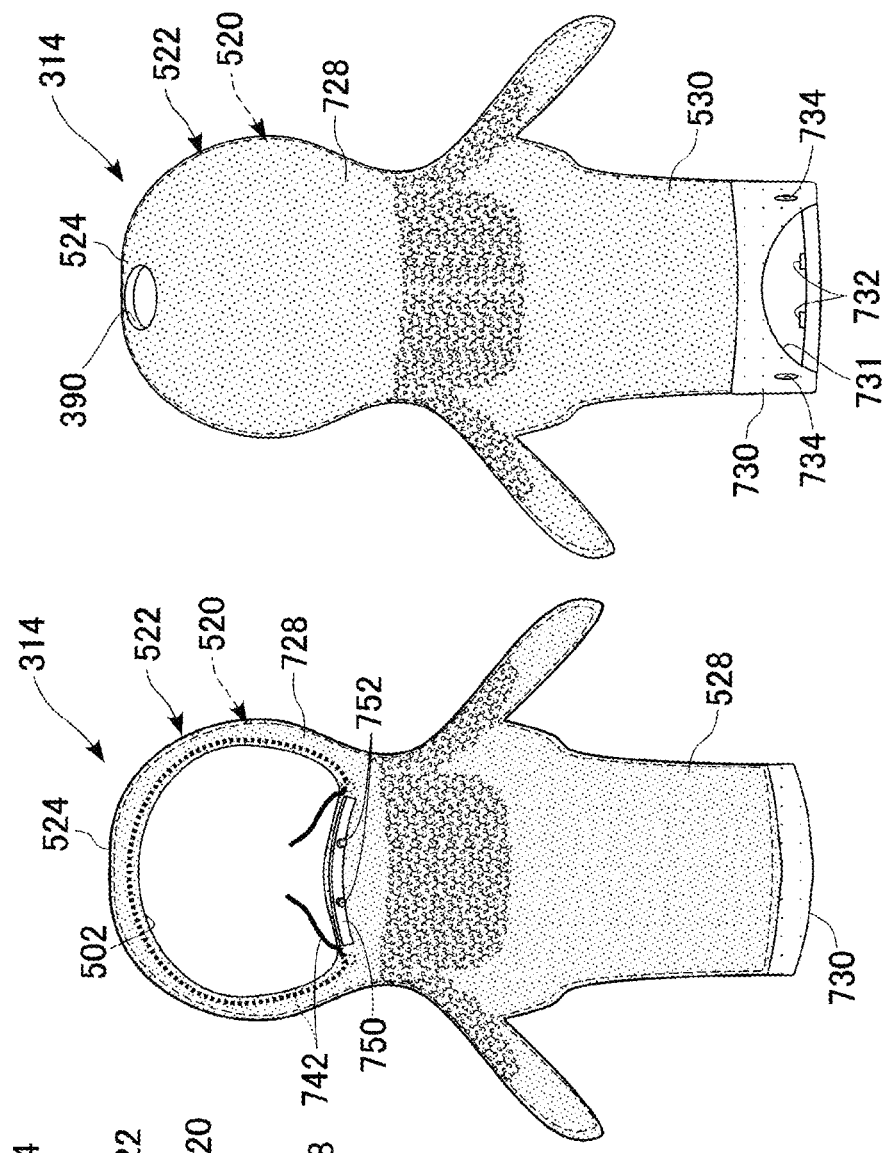
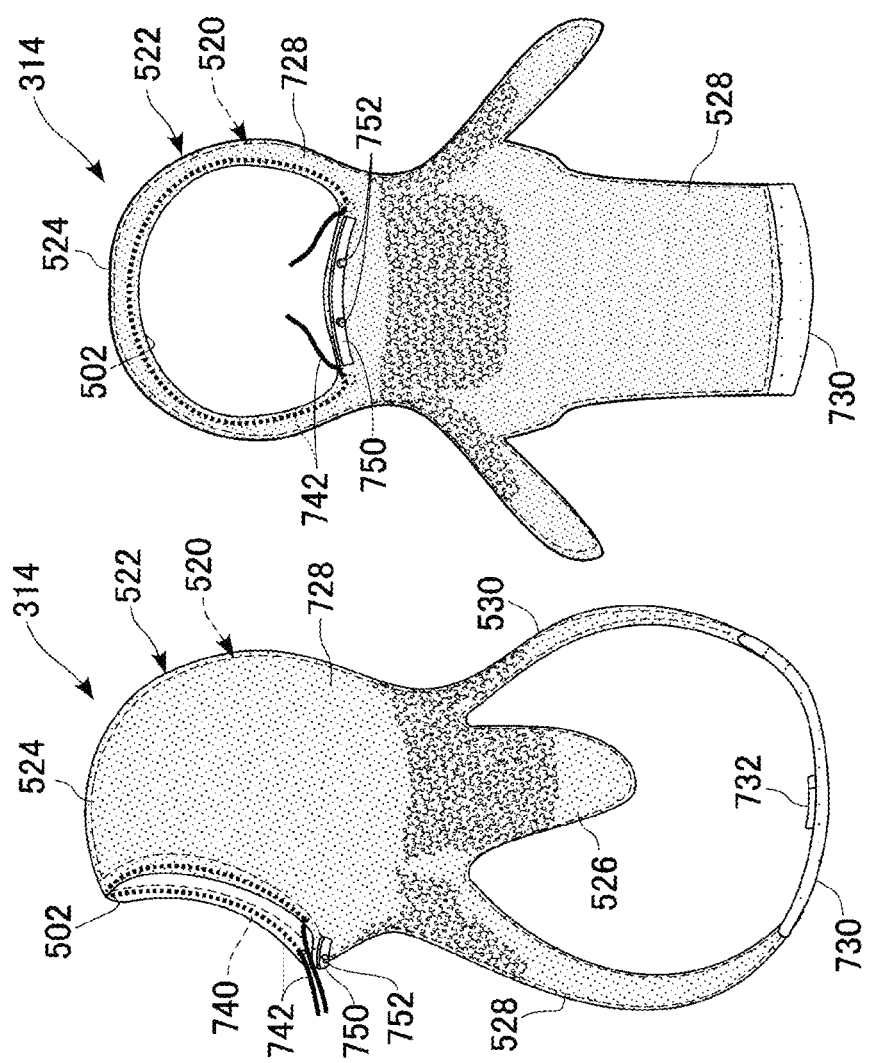

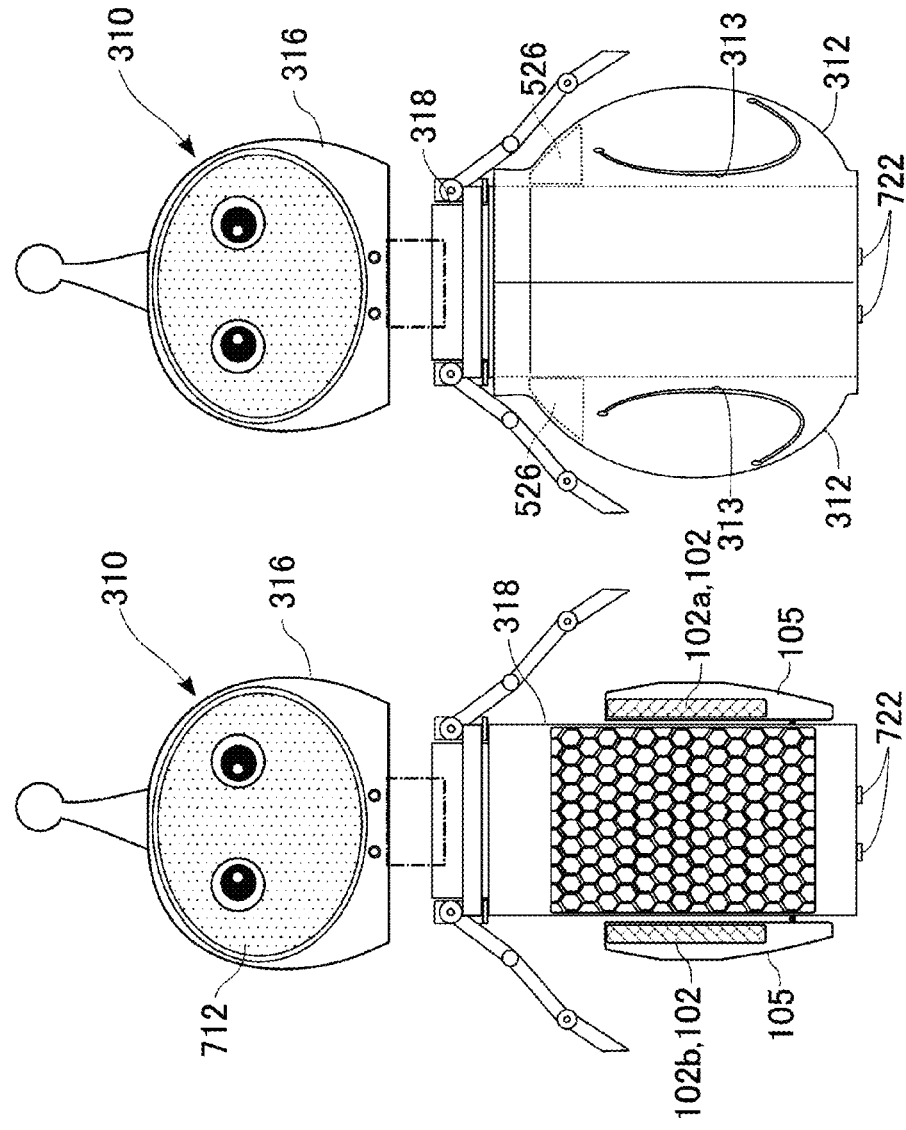
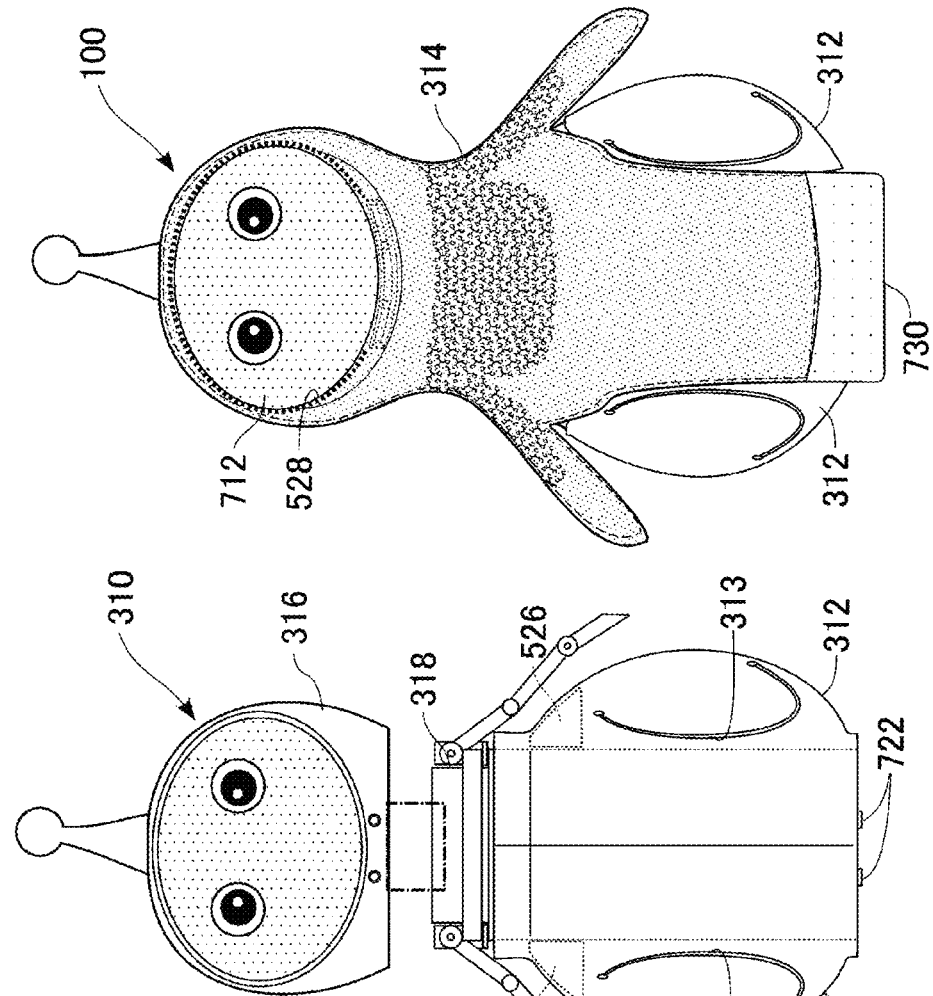
FIG. 8A  FIG. 8B  FIG. 8C

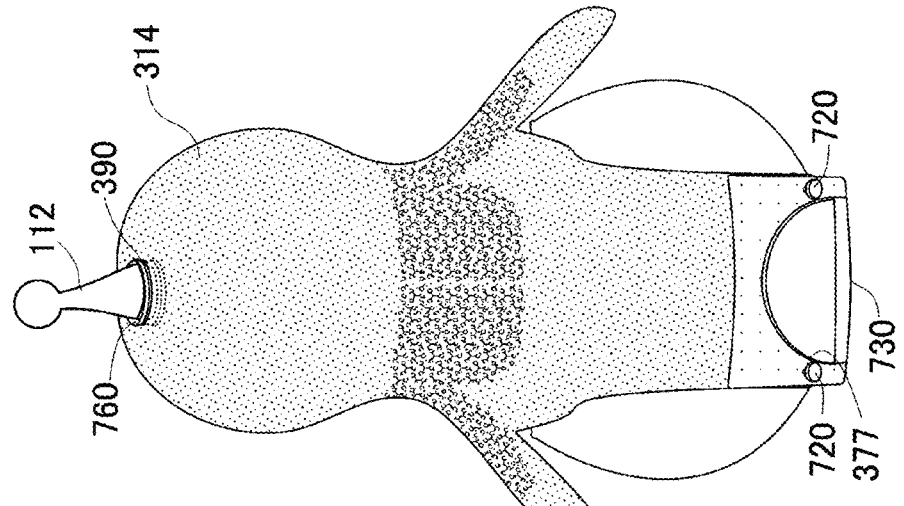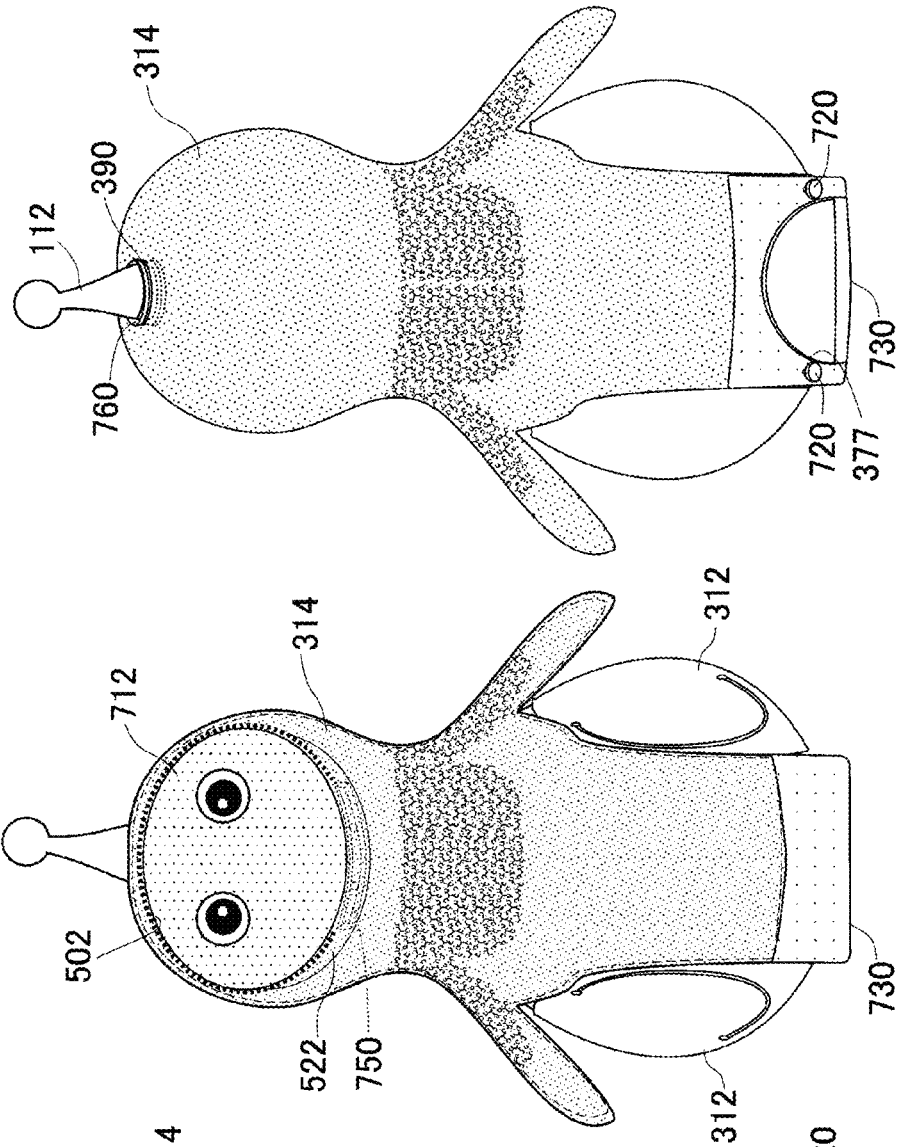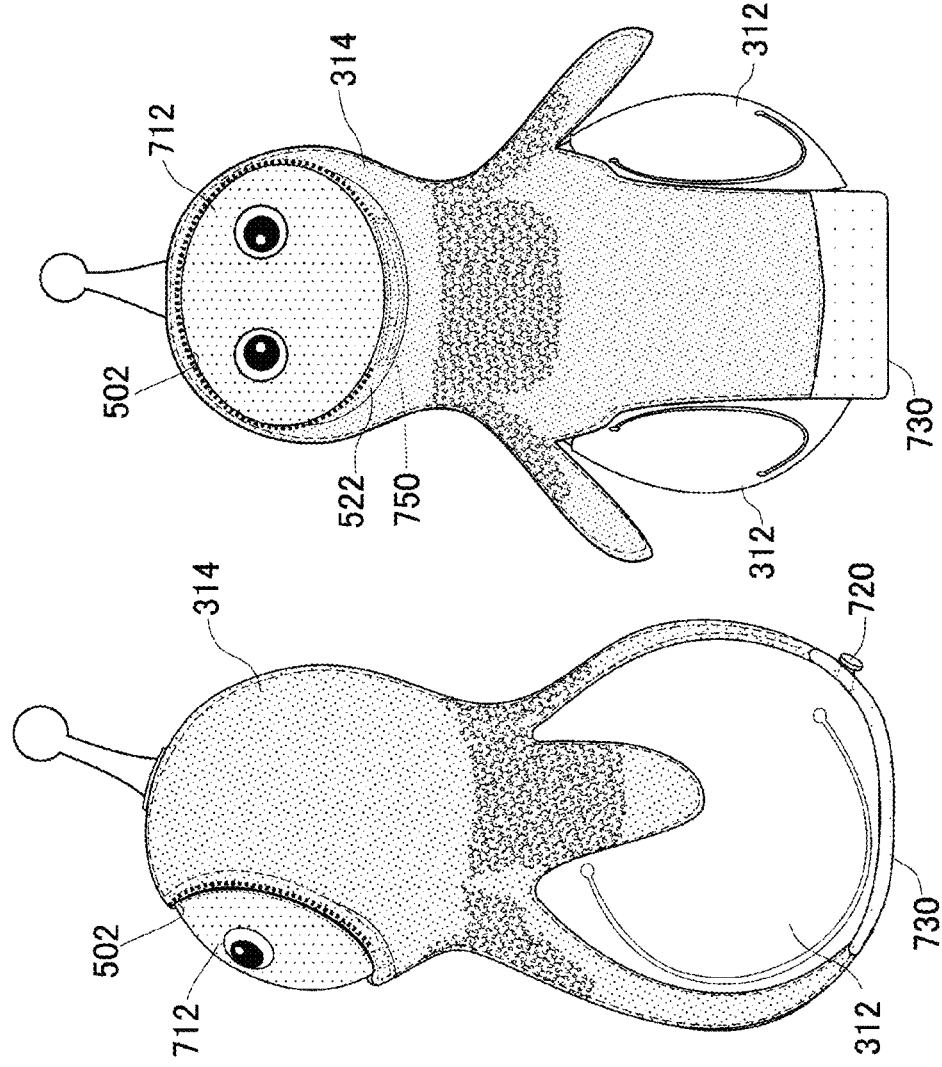

ROBOT HAVING FLEXIBLE OUTER SKIN

RELATED APPLICATIONS

The present application is a continuation of International Application No. PCT/JP2019/019243, filed May 15, 2019, which claims priority from Japanese Application No. 2018-093430, filed May 15, 2018, the disclosures of which applications are hereby incorporated by reference herein in their entirety.

BACKGROUND OF THE INVENTION

Field of the Invention

The present invention relates to a robot including a flexible outer skin that covers a body.

Description of the Background Art

There have been advances in development of an autonomously acting robot, such as a humanoid robot or a pet robot, that provides interaction and solace for a human (for example, refer to JP-A-2000-323219). This kind of robot causes behavior to evolve by learning autonomously based on a peripheral situation, and robots that create an impression of being alive are starting to appear.

However, as a robot realizes one motion by individually controlling a drive of actuators provided in a coupling unit of each region, there is inevitably an unnatural appearance caused by mechanical behavior.

SUMMARY OF THE INVENTION

At least one embodiment of the invention provides a robot that can realize more natural, animal-like behavior.

An aspect of the invention is a robot. The robot includes a base portion, a first movable portion supported by the base portion, a flexible outer skin provided in such a way as to come into contact with the first movable portion and cover the base portion, and a second movable portion, provided in contact with the outer skin, whose relative displacement with respect to the base portion changes in accompaniment to a displacement of the outer skin that accords with an operation of the first movable portion.

According to an aspect of the invention, a robot that can realize more natural, animal-like behavior can be provided.

BRIEF DESCRIPTION OF THE DRAWINGS

FIGS. 6A to 6C are illustrations representing a structure of the robot;

FIGS. 7A to 7C are illustrations representing a structure of the robot;

FIGS. 8A to 8C are illustrations representing a structure of the robot;

FIGS. 9A to 9C are illustrations representing a structure of the robot;

DETAILED DESCRIPTION OF THE INVENTION

Figure 1A:
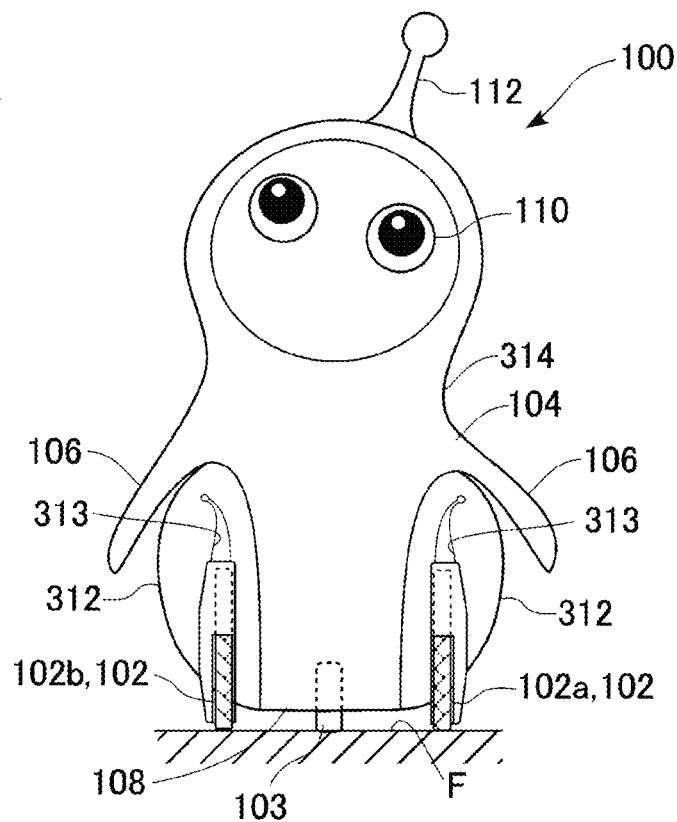
FIGS. 1A and 1B are drawings representing an external view of a robot according to an embodiment.

Hereafter, an embodiment of the invention will be described in detail, with reference to the drawings. For the sake of convenience, a positional relationship between structures may be expressed with a state shown in the drawings as a reference in the following description. Also, in the following embodiment and modified examples thereof, the same reference signs are allotted to components that are practically identical, and a description thereof is omitted as appropriate.

A robot of the embodiment is such that an arm (shoulder) naturally follows a movement of a head portion. This following movement of the arm is realized not by a control of a drive mechanism thereof, but by elasticity of a flexible outer skin being utilized. Because of this, supple, animal-like behavior can be realized. A posture of the robot is realized by combining two factors, which are moving a main framework that changes an outline of a body and moving a detailed portion such as an arm. In the embodiment, a large movement is realized utilizing a flexible outer skin, and movement of a detailed portion is realized by control of a motor. Because of this, a natural motion can be realized with a small number of actuators. Hereafter, a specific configuration of this kind of robot will be described.

Figure 1B:
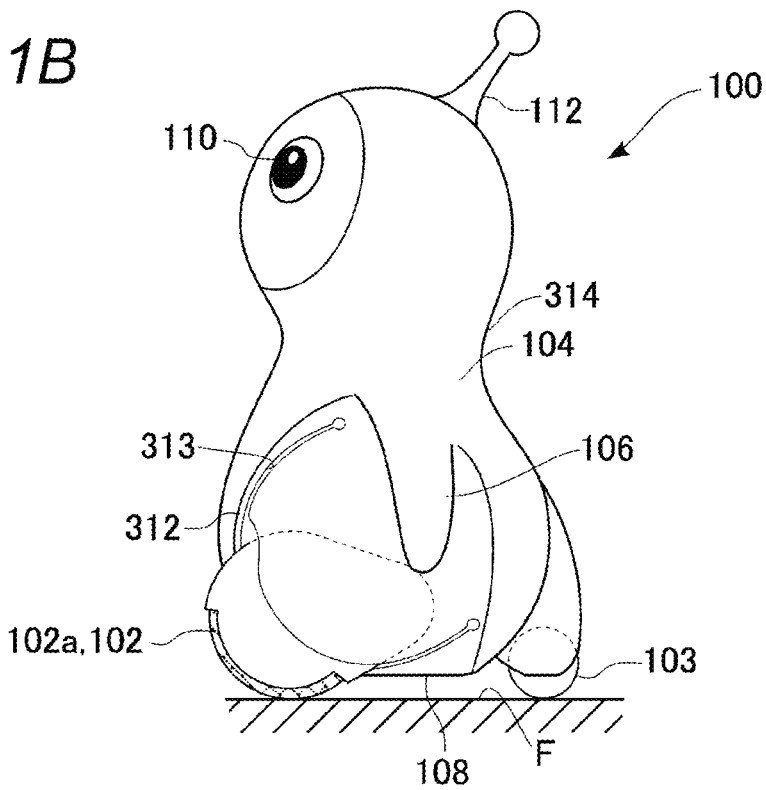

FIGS. 1A and 1B are drawings representing an external view of a robot 100 according to the embodiment. FIG. 1A is a front view, and FIG. 1B is a side view.

The robot 100 is an autonomously acting robot that determines an action or a gesture based on an external environment and an internal state. The external environment is recognized using various kinds of sensor, such as a camera or a thermosensor. The internal state is quantified as various parameters that express emotions of the robot 100. The robot 100 has an interior of an owner's home as an action range. Hereafter, a human involved with the robot 100 will be called a "user".

A body 104 of the robot 100 has a rounded form all over, and includes an outer skin 314 formed of a soft material having elasticity, such as urethane rubber, a resin, or a fiber. The robot 100 may be clothed. A total weight of the robot 100 is in the region of 5 to 15 kilograms, and a height is in the region of 0.5 to 1.2 meters. Owing to the attributes of appropriate weight, roundness, softness, and a pleasant tactile sensation, advantages are realized in that a user finds the robot 100 easy to hold, and feels a desire to hold the robot 100.

The robot 100 includes a pair of front wheels 102 (a left front wheel 102a and a right front wheel 102b) and one rear wheel 103. The front wheels 102 are drive wheels, and the rear wheel 103 is a driven wheel. Although the front wheels 102 have no steering mechanism, rotational speed and a direction of rotation of the left and right wheels can be individually controlled. The rear wheel 103 is a caster, and rotates freely in order to cause the robot 100 to move forward and back, and left and right. The rear wheel 103 may also be an omni wheel. By controlling so that the rotational speed of the right front wheel 102b is greater than that of the left front wheel 102a, the robot 100 can turn left or rotate counterclockwise. By controlling so that the rotational speed of the left front wheel 102a is greater than that of the right front wheel 102b, the robot 100 can turn right or rotate clockwise.

The front wheels 102 and the rear wheel 103 can be completely housed in the body 104 using a drive mechanism (a pivoting mechanism and a linking mechanism) to be described hereafter. A left and right pair of covers 312 are provided in a lower half portion of the body 104. The covers 312 are formed of a resin material (rubber, silicone rubber, or the like) having flexibility and elasticity, configure a soft trunk, and can house the front wheels 102. A slit 313 (an aperture portion) opened from a side face to a front face is formed in the cover 312, and the front wheel 102 is caused to advance through the slit 313, whereby the front wheel 102 can be exposed to an exterior.

A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a grounding bottom face) formed in a bottom portion of the body 104 comes into contact with the floor surface F. Details of a structure and an operation of a wheel housing mechanism will be described hereafter.

The robot 100 has two arm portions 106. Although there is a hand at a leading end of the arm portion 106, there is no function of gripping an object. The arm portion 106 is capable of performing simple actions such as raising, bending, waving, and oscillating, using a drive of an actuator to be described hereafter. The two arm portions 106 can be individually controlled.

Two eyes 110 are provided in a head portion front face (a face) of the robot 100. The eye 110 is displayed with various expressions using a liquid crystal element or an organic EL element. The robot 100 incorporates a speaker, and is also capable of simple speech. A horn 112 is attached to an apex portion of the robot 100. An omnidirectional camera is incorporated in the horn 112, and can film in all directions up and down and left and right at one time. Also, a high resolution camera (not shown) is provided in the head portion front face of the robot 100.

In addition to this, the robot 100 incorporates various sensors, such as a temperature sensor that detects a peripheral temperature, a microphone array having a multiple of microphones, a form measuring sensor (depth sensor) that can measure a form of a measurement target, and an ultrasonic wave sensor.

Figure 2:
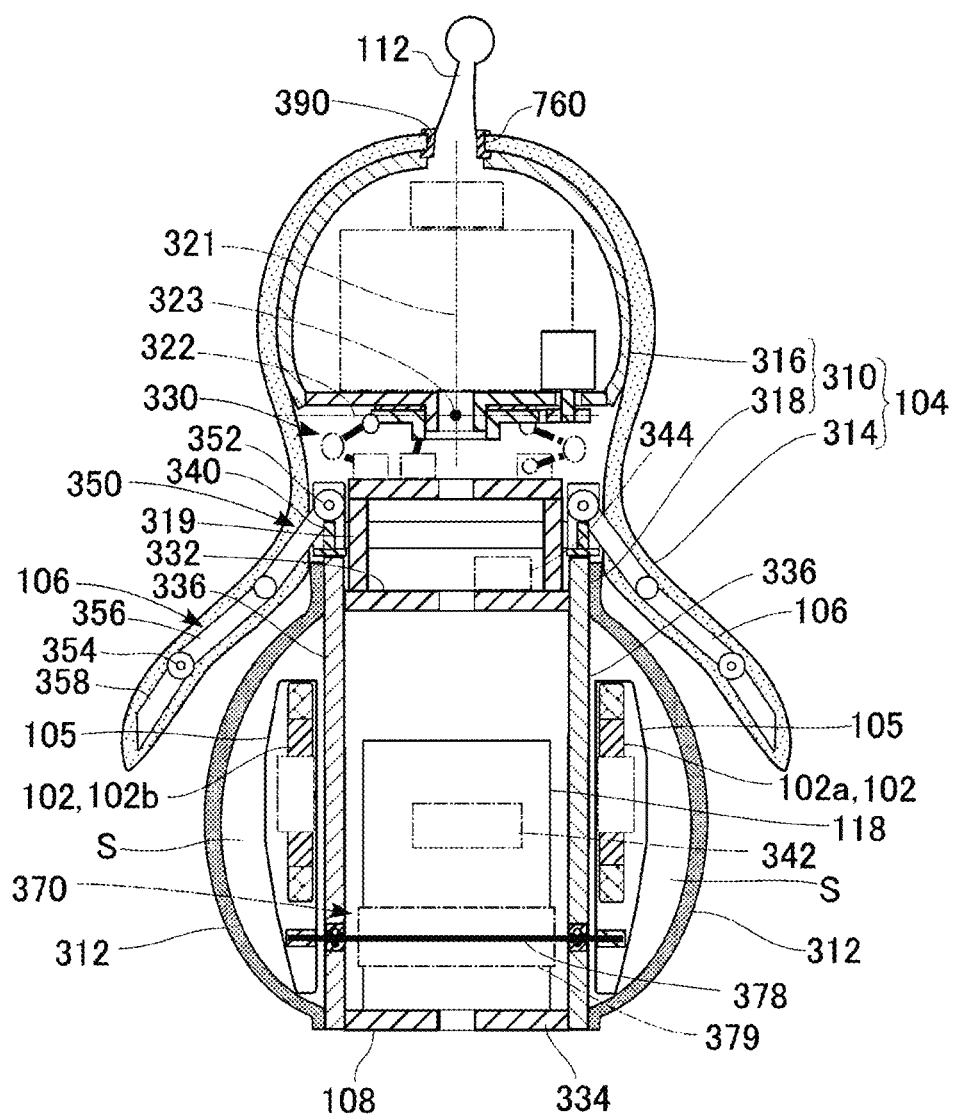
FIG. 2 is a sectional view schematically representing a structure of the robot.

FIG. 2 is a sectional view schematically representing a structure of the robot 100.

The body 104 includes a main body frame 310, the pair of arm portions 106, the pair of covers 312, and the outer skin 314. The main body frame 310 includes a head portion frame 316 and a trunk portion frame 318. The head portion frame 316 is of a hollow hemispherical form, and forms a head portion framework of the robot 100. The trunk portion frame 318 is of a rectangular cylindrical form, and forms a trunk portion framework of the robot 100. A lower end portion of the trunk portion frame 318 is fixed to a lower plate 334. The head portion frame 316 is connected to the trunk portion frame 318 via a connecting mechanism 330.

The trunk portion frame 318 functions as a "base portion", and configures an axial center of the body 104. The trunk portion frame 318 is configured by a left and right pair of side plates 336 being fixed to the lower plate 334, and supports the pair of arm portions 106 and an internal mechanism. A battery 118, a control circuit 342, and various kinds of actuator and the like are housed inside the trunk portion frame 318. A bottom face of the lower plate 334 forms the seating face 108.

The trunk portion 318 has an upper plate 332 in an upper portion thereof. A bottomed cylindrical support portion 319 is fixed to the upper plate 332. The upper plate 332, the lower plate 334, the pair of side plates 336, and the support portion 319 configure the trunk portion frame 318. An outer diameter of the support portion 319 is smaller than an interval between the left and right side plates 336. Each of the pair of arm portions 106 functions as a "second movable portion", and configures an arm unit 350 by being assembled integrated with an annular member 340. The annular member 340 forms a circle, and the pair of arm portions 106 are attached so as to separate in a radial direction along a central line of the annular member 340. The annular member 340 is coaxially fitted over the support portion 319, and placed on upper end faces of the pair of side plates 336. The arm unit 350 is supported from below by the trunk portion frame 318.

The head portion frame 316 has a yaw shaft 321, a pitch shaft 322, and a roll shaft 323. A head shaking action is realized by a turning (yawing) of the head portion frame 316 around the yaw shaft 321, a nodding action, a looking up action, and a looking down action are realized by a turning (pitching) around the pitch shaft 322, and an action of tilting the head left or right is realized by a turning (rolling) around the roll shaft 323. A position and angle of each shaft in a three-dimensional space can change in accordance with a drive aspect of the connecting mechanism 330. The connecting mechanism 330 is formed of a linking mechanism, and is driven by a multiple of motors installed in the trunk portion frame 318. The head portion frame 316 functions as a "first movable portion".

The trunk portion frame 318 houses a wheel drive mechanism 370. The wheel drive mechanism 370 includes a front wheel drive mechanism and a rear wheel drive mechanism that drive the front wheels 102 and the rear wheel 103 respectively out of and into the body 104. The front wheels 102 and the rear wheel 103 function as "movement mechanisms" that cause the robot 100 to move. The front wheel 102 has a direct drive motor (hereafter written as "DD motor") in a central portion thereof. Because of this, the left front wheel 102a and the right front wheel 102b can be driven individually. The front wheel 102 is supported so as to be able to rotate by a wheel cover 105, and the wheel cover 105 is supported so as to be able to pivot by the trunk portion frame 318.

The pair of covers 312 are provided so as to cover the trunk portion frame 318 from left and right, and are of a smooth curved form in order to provide an outline of the body 104 with roundness. A closed space is formed between the trunk portion frame 318 and the cover 312, and the closed space forms a housing space S for the front wheel 102. The rear wheel 103 is housed in a housing space provided in a lower rear portion of the trunk portion frame 318.

The outer skin 314 covers the main body frame 310 and the pair of arm portions 106 from an outer side. The outer skin 314 has a thickness of an extent such that a person feels elasticity, and is formed of a material having elasticity, such as urethane sponge. Because of this, a user feels a moderate degree of softness when hugging the robot 100, and can make natural physical contact, as a person does with a pet. The outer skin 314 is mounted on the main body frame 310 in an aspect such as to cause the cover 312 to be exposed. An aperture portion 390 is provided in an upper end portion of the outer skin 314. The horn 112 is inserted together with a guide 760, to be described hereafter, through the aperture portion 390.

A touch sensor is disposed between the main body frame 310 and the outer skin 314. A touch sensor is embedded in the cover 312. Each of these touch sensors is a capacitive sensor, and a touch in practically all regions of the robot 100 is detected. In a modified example, a touch sensor may be embedded in the outer skin 314, or a touch sensor may be disposed on an inner side of the main body frame 310.

The arm portion 106 has a first joint 352 and a second joint 354, and has an arm 356 between the two joints, and a hand 358 on a tip of the second joint 354. The first joint 352 corresponds to a shoulder joint, and the second joint 354 corresponds to a wrist joint. A motor is provided in each joint, whereby the arm 356 and the hand 358 are individually driven. A drive mechanism for driving the arm portion 106 includes the motors and a drive circuit 344 thereof (an energization circuit). Details of the arm unit 350 including the arm portion 106 will be described hereafter.

Figure 3A:
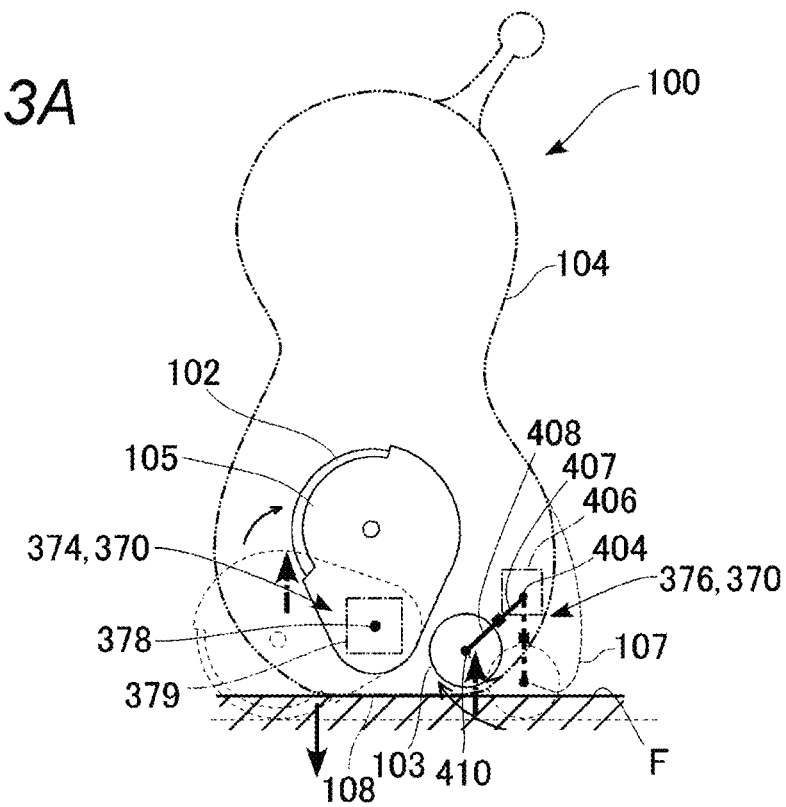
FIGS. 3A and 3B are drawings schematically showing a structure and an operation of a wheel housing mechanism.
Figure 3B:
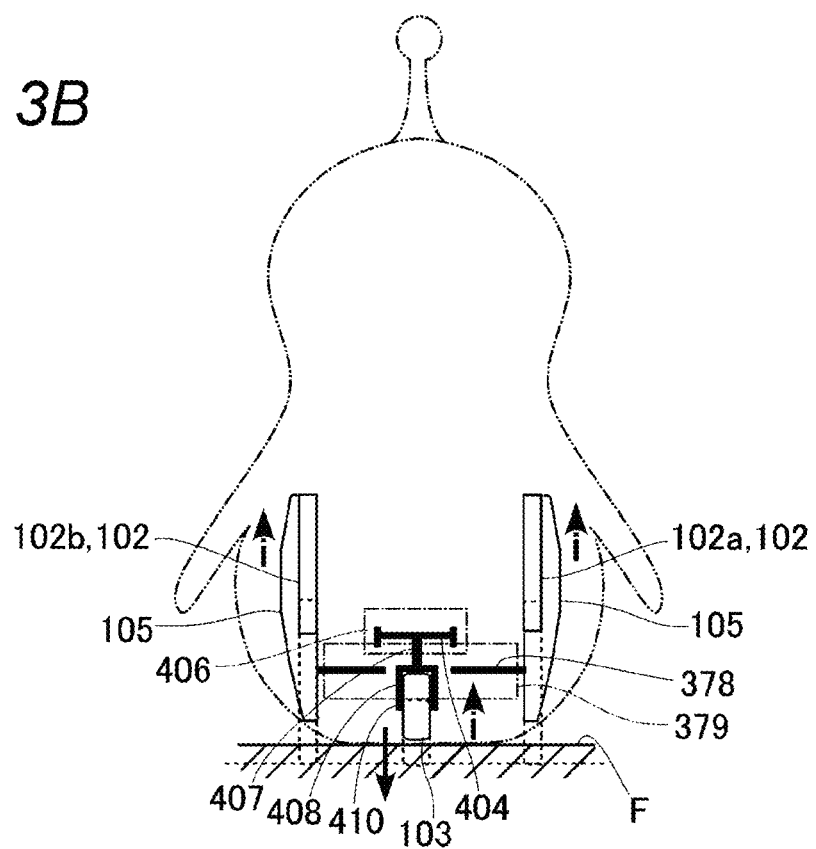

FIGS. 3A and 3B are drawings schematically showing a structure and an operation of a wheel housing mechanism. FIG. 3A is a side view, and FIG. 3B is a front view. A dotted line in the drawings indicates a state in which a wheel has advanced from the housing space S and can travel, and a solid line in the drawing indicates a state in which a wheel is housed in the housing space S.

The wheel drive mechanism 370 includes a front wheel drive mechanism 374 and a rear wheel drive mechanism 376. The front wheel drive mechanism 374 includes a pivot shaft 378 and an actuator 379. The pivot shaft 378 is coupled to the wheel cover 105. In the embodiment, a motor is employed as the actuator 379. The front wheel 102 can be driven to reciprocate between the housing space S and the exterior by causing the wheel cover 105 to pivot using a drive of the actuator 379.

The rear wheel drive mechanism 376 includes a pivot shaft 404 and an actuator 406. A rotary shaft 407 is supported in a center of the pivot shaft 404. Two arms 408 extend from the rotary shaft 407, and an axle 410 is provided integrated with leading ends of the arms 408. The rear wheel 103 is supported so as to be able to rotate by the axle 410. The rotary shaft 407 rotates freely around its own axis, and causes an orientation (a direction of travel) of the rear wheel 103 to change arbitrarily. The rear wheel 103 can be driven to reciprocate between a rear portion housing space and the exterior by a drive of the actuator 406.

When housing the wheels, the actuators 379 and 406 are driven in one direction. At this time, the wheel cover 105 pivots centered on the pivot shaft 378, and the front wheel 102 rises from the floor surface F. Also, the arm 408 pivots centered on the pivot shaft 404, and the rear wheel 103 rises from the floor surface F (refer to a dashed-dotted line arrow). Because of this, the body 104 descends, and the seating face 108 is grounded at the floor surface F (refer to a solid line arrow). Because of this, a state in which the robot 100 is sitting is realized. By the actuators 379 and 406 being driven in the opposite direction, each wheel is caused to advance out of the housing space, whereby the robot 100 can be caused to stand.

A rear portion cover 107 resembling a tail is provided on an outer side of the rear wheel 103, and opens and closes a rear portion lower aperture portion of the body 104 in conjunction with the rear wheel 103. That is, the rear portion cover 107 operates so as to open when the rear wheel 103 is caused to advance, and the rear portion cover 107 operates so as to close when housing the rear wheel 103.

Figure 4:
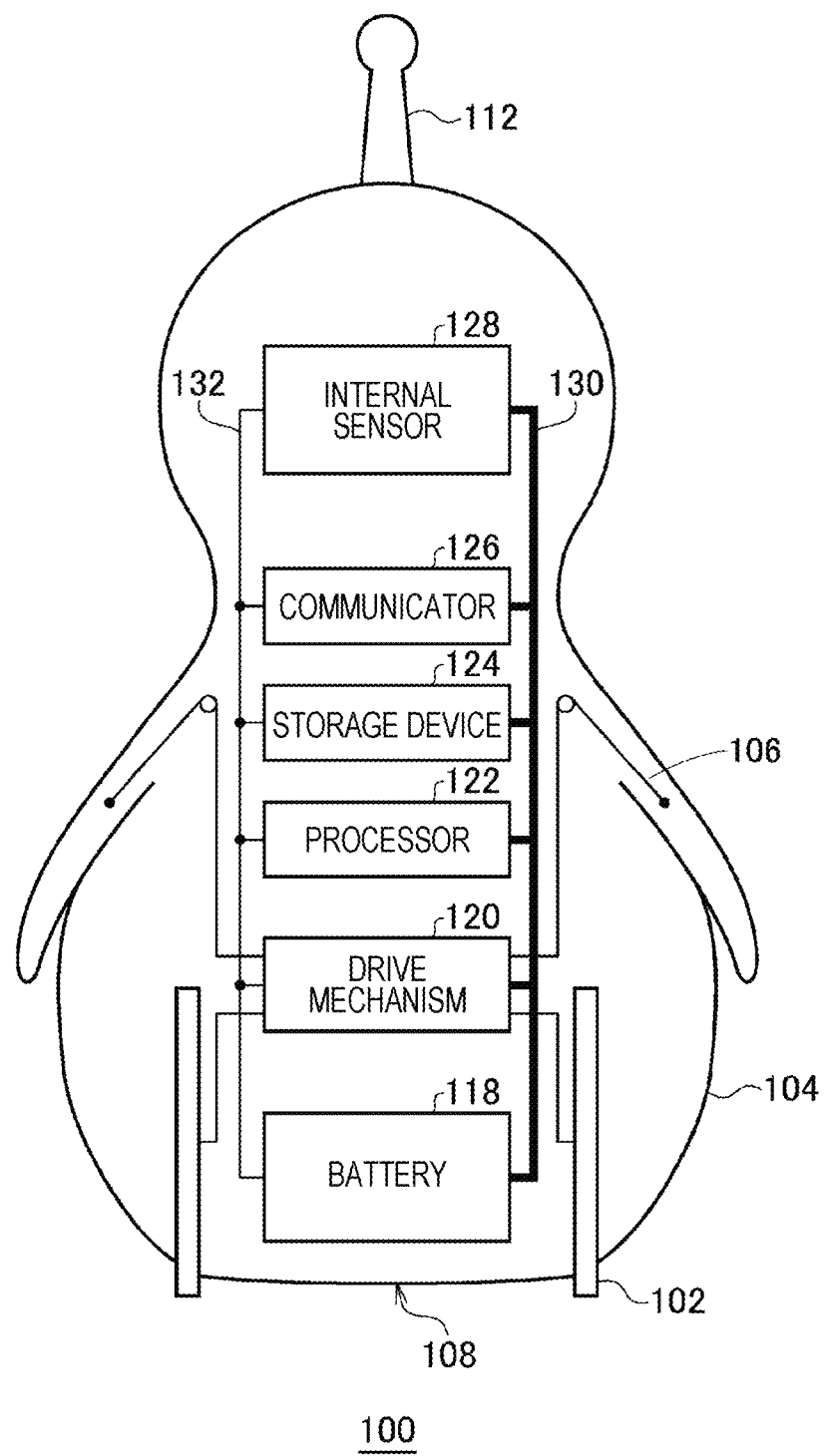
FIG. 4 is a hardware configuration diagram of the robot.

FIG. 4 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described connecting mechanism 330 and wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera (omnidirectional camera, high resolution camera), a microphone array, a distance measuring sensor (infrared sensor), a thermosensor, a touch sensor, an acceleration sensor, a smell sensor, and the like. The touch sensor is effective in a greater portion of regions of the body 104, and detects a touch by a user based on a change in capacitance. The smell sensor is an already known sensor that applies a principle that electrical resistance changes in accordance with an adsorption of molecules that form a source of a smell.

The communicator 126 is a communication module that carries out wireless communication with a server 200, to be described hereafter, and various kinds of external device, such as the external sensor 114 or a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls the internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls a movement of a wheel (the front wheel 102) and the head portion (the head portion frame 316). The drive mechanism 120 causes a direction of movement and a movement speed of the robot 100 to change by changing the rotational speed and the direction of rotation of each of the two front wheels 102. Also, the drive mechanism 120 can also raise and lower the wheels (the front wheels 102 and the rear wheel 103). When the wheels rise, the wheels are completely housed in the body 104, and the robot 100 comes into contact with the floor surface F via the seating face 108, taking on the sitting state. Also, the drive mechanism 120 controls the arm portion 106.

Figure 5:
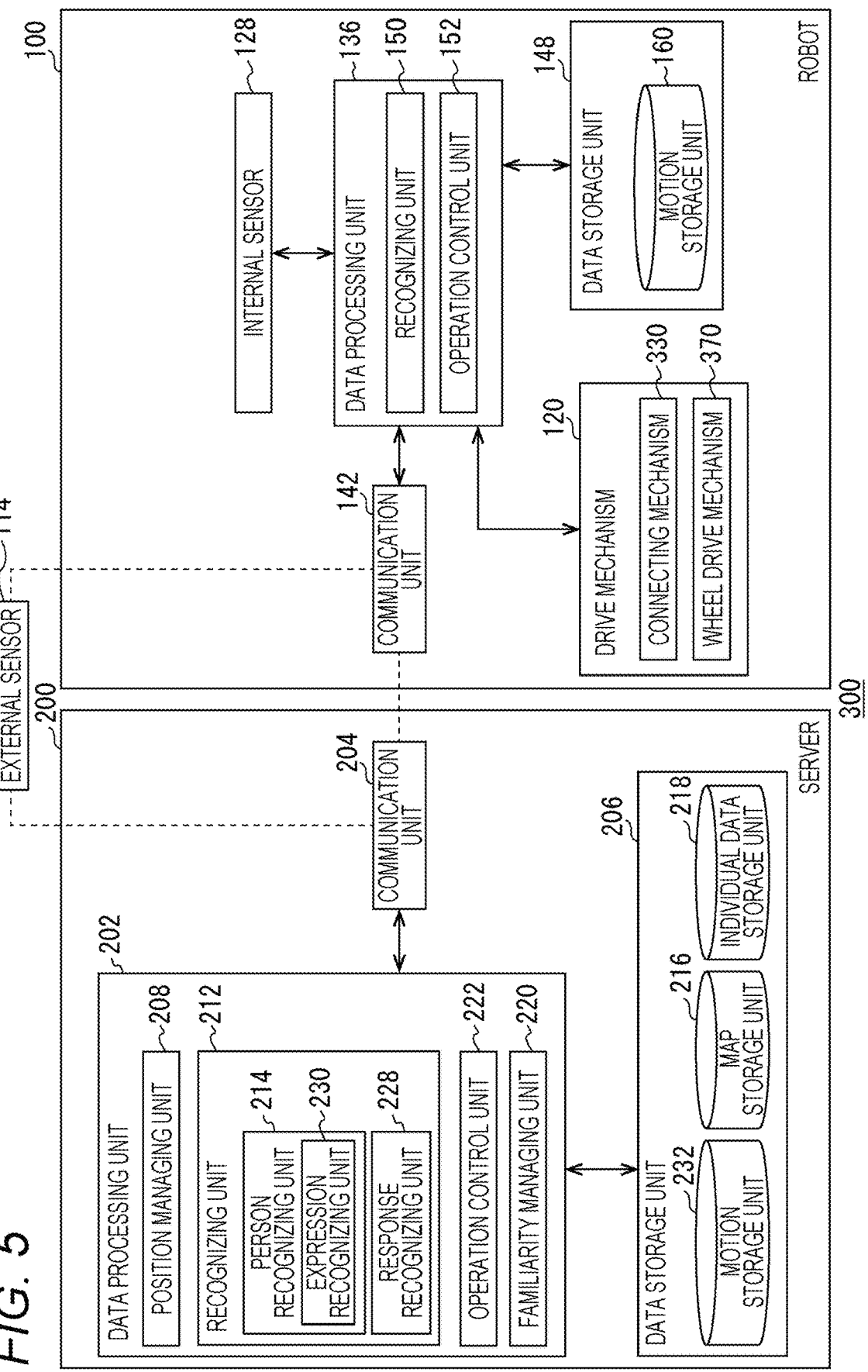
FIG. 5 is a functional block diagram of a robot system.

FIG. 5 is a functional block diagram of a robot system 300.

The robot system 300 includes the robot 100, the server 200, and a multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

The multiple of external sensors 114 are installed in advance in a house. Positional coordinates of the external sensor 114 are registered in the server 200. The server 200 determines a basic action of the robot 100 based on information obtained from the internal sensor 128 of the robot 100 and the multiple of external sensors 114. The external sensor 114 is for reinforcing a sensory organ of the robot 100, and the server 200 is for reinforcing a processing capacity of the robot 100. The communicator 126 of the robot 100 regularly communicates with the external sensor 114, and the server 200 identifies a position of the robot 100 using the external sensor 114.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218. The robot 100 has a multiple of operation patterns (motions). Various motions, such as waving the arm portion 106, approaching a user while meandering, and staring at a user with the head to one side, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100. Many motions of the robot 100 are configured as compound motions that include a multiple of unit motions.

In addition to an action map defining an action of a robot that accords with a situation, the map storage unit 216 also stores a map showing a disposition state of an obstacle such as a chair or a table. The individual data storage unit 218 stores information regarding a user. Specifically, the individual data storage unit 218 stores familiarity with respect to a user, and master information indicating physical characteristics and behavioral characteristics of the user. The individual data storage unit 218 may also store other attribute information such as age and gender.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a recognizing unit 212, an operation control unit 222, and a familiarity managing unit 220. The position managing unit 208 identifies the positional coordinates of the robot 100. The position managing unit 208 also tracks positional coordinates of a user in real time.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. A recognizing unit 150 of the robot 100 acquires various kinds of environmental information using the internal sensor 128, and transmits the environmental information to the recognizing unit 212 of the server 200 after carrying out a primary processing.

Furthermore, the recognizing unit 212 includes a person recognizing unit 214 and a response recognizing unit 228. The person recognizing unit 214 determines what person a filmed user corresponds to by comparing a feature vector extracted from an image filmed by the camera incorporated in the robot 100 and a feature vector of a user (cluster) registered in advance in the individual data storage unit 218 (a user identification process). The person recognizing unit 214 includes an expression recognizing unit 230. The expression recognizing unit 230 infers an emotion of a user by carrying out image recognition of an expression of the user.

The response recognizing unit 228 recognizes various responsive actions performed with respect to the robot 100, and classifies the actions as pleasant or unpleasant actions. Also, the response recognizing unit 228 recognizes a responsive action of a user with respect to an action of the robot 100, thereby classifying the responsive action as a positive or negative response. Pleasant and unpleasant actions are distinguished depending on whether a responsive action of a user is pleasing or unpleasant for a living being.

The operation control unit 222 determines a motion of the robot 100 in cooperation with an operation control unit 152 of the robot 100. The operation control unit 222 compiles a movement target point of the robot 100, and a movement route for the movement target point. The operation control unit 222 compiles a multiple of movement routes, and having done so, may select any of the movement routes. The operation control unit 222 selects a motion of the robot 100 from a multiple of motions in the motion storage unit 232.

The familiarity managing unit 220 manages familiarity for each user. Familiarity is registered as one portion of individual data in the individual data storage unit 218. When a pleasant action is detected, the familiarity managing unit 220 increases familiarity with respect to that user. When an unpleasant action is detected, familiarity decreases. Also, familiarity of an owner who has not been visually recognized for a long period gradually decreases.

Robot 100

The robot 100 includes a communication unit 142, a data processing unit 136, a data storage unit 148, the internal sensor 128, and the drive mechanism 120. The communication unit 142 corresponds to the communicator 126 (refer to FIG. 4), and manages a process of communicating with the external sensor 114, the server 200, and another robot 100. The data storage unit 148 stores various kinds of data. The data storage unit 148 corresponds to the storage device 124 (refer to FIG. 4). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100. Various kinds of motion file are downloaded from the motion storage unit 232 of the server 200 into the motion storage unit 160. A motion is identified by motion ID. An operating timing, an operating time, an operating direction, and the like, of the various kinds of actuator (the drive mechanism 120) are defined chronologically in a motion file in order to perform various motions.

Various kinds of data may also be downloaded from the map storage unit 216 and the individual data storage unit 218 into the data storage unit 148.

The data processing unit 136 includes the recognizing unit 150 and the operation control unit 152. The recognizing unit 150 analyzes external information obtained from the internal sensor 128. The recognizing unit 150 is capable of visual recognition (a visual unit), smell recognition (an olfactory unit), sound recognition (an aural unit), and tactile recognition (a tactile unit).

The recognizing unit 150 regularly films an exterior angle using the incorporated omnidirectional camera, and detects a moving object such as a person or a pet. The recognizing unit 150 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from a smell sensor, an incorporated highly directional microphone, a temperature sensor, and the like. These characteristics are also quantified, forming a feature vector component.

The familiarity managing unit 220 of the server 200 changes the familiarity toward a user in accordance with a responsive action recognized by the recognizing unit 150. In principle, the familiarity toward a user who carries out a pleasant action increases, while the familiarity toward a user who carries out an unpleasant action decreases.

The operation control unit 152 decides a direction of movement of the robot 100 together with the operation control unit 222 of the server 200. A movement based on an action map may be determined by the server 200, and an instantaneous movement such as avoiding an obstacle may be determined by the robot 100. The drive mechanism 120 causes the robot 100 to head toward a movement target point by driving the front wheels 102 (the wheel drive mechanism 370) in accordance with an instruction from the operation control unit 152.

The operation control unit 152 decides a motion of the robot 100 in cooperation with the operation control unit 222 of the server 200. One portion of motions may be determined by the server 200, and other motions may be determined by the robot 100. Also, a configuration may be such that although the robot 100 determines a motion, the server 200 determines a motion when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 152 instructs the drive mechanism 120 to execute a selected motion. The drive mechanism 120 controls each actuator in accordance with a motion file. When a head portion operation or a wheel advancing or withdrawing operation is defined in a motion file, the operation control unit 152 executes control of the operation by driving the drive mechanism 120.

The operation control unit 152 can also execute a motion of holding up both arm portions 106 as a gesture asking for "a hug" when a user with a high degree of familiarity is nearby, and can also perform a motion of no longer wanting to be hugged by causing the left and right front wheels 102 to alternately and repeatedly rotate in reverse and stop in a housed state when bored of the "hug". The drive mechanism 120 causes the robot 100 to perform various motions by driving the front wheels 102, the arm portion 106, and the head (the head portion frame 316) in accordance with an instruction from the operation control unit 152.

Next, a characteristic configuration and operation of the robot 100 will be described.

FIGS. 6A to 9C are illustrations representing a structure of the robot 100. FIGS. 6A to 6C are drawings representing a state in which the outer skin 314 and the cover 312 have been removed from the robot 100. FIGS. 7A to 7C are drawings representing the outer skin 314. FIGS. 8A to 8C are drawings schematically representing a method of assembling the body 104. FIGS. 8A to 8C show an assembly process. FIGS. 9A to 9C are drawings representing a state in which the outer skin 314 is mounted on the robot 100. A in each drawing is a left side view, B is a front view, and C is a back view. An external appearance of the robot 100 effectively has bilateral symmetry.

As shown in FIGS. 6A to 6C, a circular aperture portion 717 is provided in a front face of the head portion frame 316, and a face member 712 is installed therein. The face member 712 is of a disc form that complements the aperture portion 717, and a front face of the face member 712 forms a facial region. An annular recessed fitting portion 706 is formed by a gap between the face member 712 and the aperture portion 717. A pair of fitting holes 708 are provided in a position below the face member 712 in the head portion frame 316.

The guide 760 is provided in an apex portion of the head portion frame 316. The guide 760 supports the horn 112, and also functions as positioning when fixing the outer skin 314. The guide 760 is of a stepped cylindrical form, and an annular fitting portion 761 is formed around an outer peripheral face of the guide 760. The guide 760 is formed of a resin material having flexibility, and also performs a sealing function when installing the horn 112 in the head portion frame 316. Details will be described hereafter.

A housing port 377 for housing the rear wheel 103 is provided in a lower rear portion of the trunk portion frame 318. Also, a pair of projections 720 are disposed projecting backward on the left and right of the housing port 377. The projection 720 is of a disc form whose leading end has a slightly larger diameter, and has a form resembling a button. A pair of hook-and-loop fasteners 722 are provided on a lower face of the trunk portion frame 318.

Protective members 570 and 572 are provided on a front face and a back face respectively of the trunk portion frame 318. Each protective member is formed of a resin member having flexibility, bulges in a direction away from the trunk portion frame 318, and is of a smooth curved form in side view. The protective members 570 and 572 and the pair of covers 312 combine in providing the outline of the body 104 with roundness. The protective member 570 protects a control circuit substrate and the like exposed in the front face of the trunk portion frame 318 by covering the control circuit substrate and the like from the front. The protective member 572 protects a control circuit substrate and the like exposed in the back face of the trunk portion frame 318 by covering the control circuit substrate and the like from the back. The protective members 570 and 572 have a honeycomb structure that increases flexibility, but details thereof will be described hereafter.

As shown in FIGS. 7A to 7C, the outer skin 314 is configured by an outer skin main body 728 and an elastic mounting portion 730 being sewn together. The outer skin main body 728 is configured by a base material 520 having elasticity being housed in a fabric bag 522, thereby being formed of a flexible material having a pleasant tactile sensation all over. The fabric bag 522 is such that a fabric material smooth to the touch, such as polyester, is sewn into a bag form, and a non-woven fabric is provided on an inner side of a face that forms an outer side when mounted on the robot 100. The outer skin main body 728 includes a bag-form portion 524 covering the head portion frame 316, a pair of hand portions 526 extending downward from left and right side faces of the bag-form portion 524, an extended portion 528 extending downward from a front face of the bag-form portion 524, and an extended portion 530 extending downward from a back face of the bag-form portion 524. A gathering portion 740 is sewn around an aperture portion 502 of the outer skin main body 728. The aperture portion 502 can be reduced to an appropriate size by pulling both ends of string 742 inserted through the gathering portion 740.

Also, a fastener 750 is attached by sewing along a portion below the aperture portion 502 on the outer skin main body 728. The fastener 750 is formed of a hard resin, and is an elongated member having practically the same curvature as a peripheral edge of the face member 712. A pair of projections 752 are provided in an intermediate portion of the fastener 750. The projections 752 can be fitted into the pair of fitting holes 708. As shown in FIG. 7B, the fastener 750 is provided in such a way that an outer diameter side (protruding side) thereof follows the form of the aperture portion 502.

The elastic mounting portion 730 links the extended portion 528 and the extended portion 530 on the front and back of the outer skin main body 728 from below. The elastic mounting portion 730 is formed of a flexible material, in the same way as the outer skin main body 728, and configures a bottom portion of the outer skin 314. Also, the elastic mounting portion 730 may also be formed of a flexible material (sponge or the like) whose elasticity differs from that of the outer skin main body 728. An aperture portion 731 is provided in a position corresponding to the housing port 377 in the elastic mounting portion 730. A pair of holes 734 are formed in a lower rear portion of the elastic mounting portion 730. The hole 734 has a small-width form like a buttonhole, but as the elastic mounting portion 730 is flexible, the hole 734 can be expanded in a width direction. One each of the pair of projections 720 can be inserted through the holes 734. A pair of hook-and-loop fasteners 732 are provided on an upper face of a bottom portion of the elastic mounting portion 730, and can be joined one each with the pair of hook-and-loop fasteners 722.

The main body frame 310, the internal mechanism thereof, and the like are assembled in a process of assembling the body 104, as shown in FIG. 8A. The front wheel 102 and the wheel cover 105 are positioned in a withdrawn state (housed state).

Continuing, the pair of covers 312 are installed and fixed on the main body frame 310 from left and right, as shown in FIG. 8B. The pair of covers 312 are configured to have bilateral symmetry with respect to the main body frame 310, and are joined on the front face and the back face thereof. In the embodiment, the joining of the two covers is carried out by welding or bonding, but fastening by screwing, or another fixing method, may be employed. In a state in which the wheels are housed, the slit 313 is in a closed state, as shown in the drawings. The front wheel 102 is completely housed inside the cover 312. The housing space S inside the cover 312 has a size such that one wheel cover 105 integrated with the front wheel 102 fits inside exactly.

Continuing, the outer skin 314 is attached to the main body frame 310, as shown in FIG. 8C. At this time, the head portion frame 316 is inserted through a side aperture portion (either one of left and right aperture portions enclosed by the outer skin main body 728 and the elastic mounting portion 730) of the outer skin 314. At this time, the head portion frame 316 is covered with the outer skin 314 while the guide 760 is inserted through the aperture portion 390. Because of this, the aperture portion 390 is fitted over the guide 760, as shown in FIG. 9C, and an upper portion of the outer skin 314 can be fixed while being positioned with respect to the head portion frame 316.

Further, after the head portion frame 316 is housed in the bag-form portion 524, the projection 752 is fitted into the fitting hole 708, and the fastener 750 is installed on the head portion frame 316. At this time, a periphery of the aperture portion 502 is rolled up while the fastener 750 is inverted vertically toward the inside of the aperture portion 502 from the state shown in FIG. 7B. Because of this, the fastener 750 is wrapped in the fabric bag 522, and attached in such a way as not to be exposed to the exterior. Further, the aperture portion 502 is appropriately reduced by pulling the string 742, and an aperture end edge is fitted into the recessed fitting portion 706. Because of this, the outer skin 314 is fixed securely to the head portion frame 316, and the facial region of the face member 712 can be clearly exposed.

Continuing, the elastic mounting portion 730 is fixed to a bottom face of the trunk portion frame 318. At this time, each of the pair of projections 720 is inserted through the corresponding hole 734. After the projection 720 is inserted through the hole 734, the hole 734 attempts to return to the original small-width form owing to an elastic force. Because of this, a head portion of the projection 720 catches on a periphery of the hole 734 in a button-like aspect, whereby separation from the trunk portion frame 318 is prevented. Also, each of the pair of hook-and-loop fasteners 732 is attached to the corresponding hook-and-loop fastener 722. In this way, the outer skin 314 can be properly fixed to the main body frame 310, as shown in FIGS. 9A to 9C.

Figure 10A:
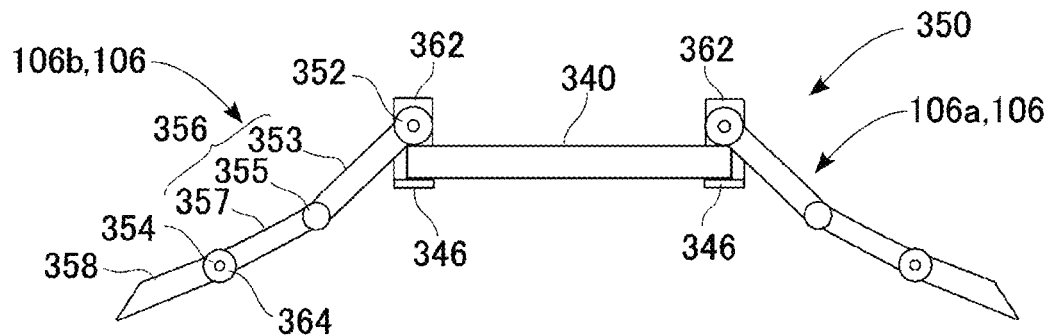
FIGS. 10A to 10C are drawings representing a configuration of an arm unit.
Figure 10B:
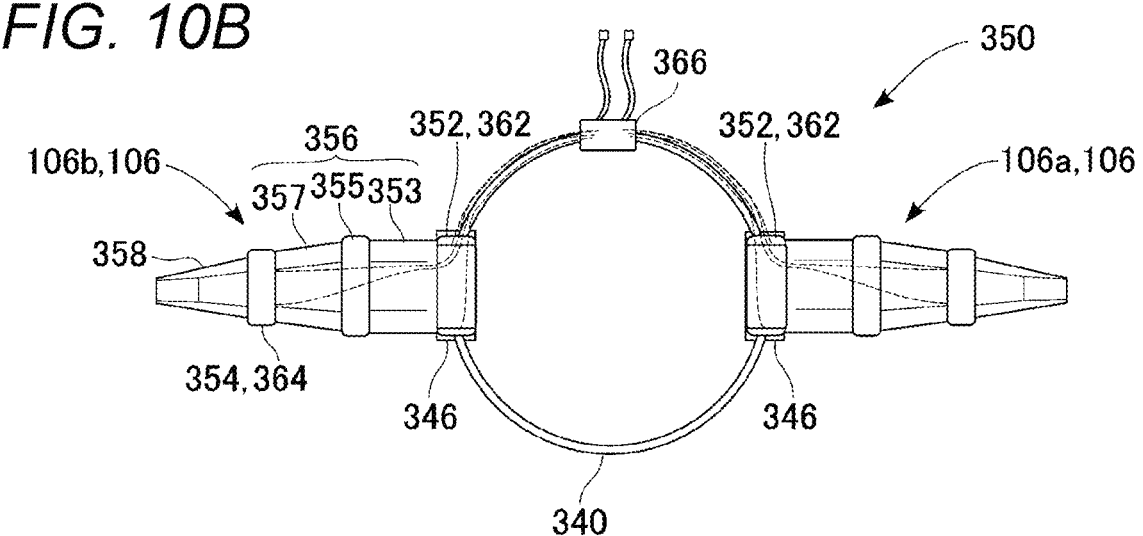
Figure 10C:
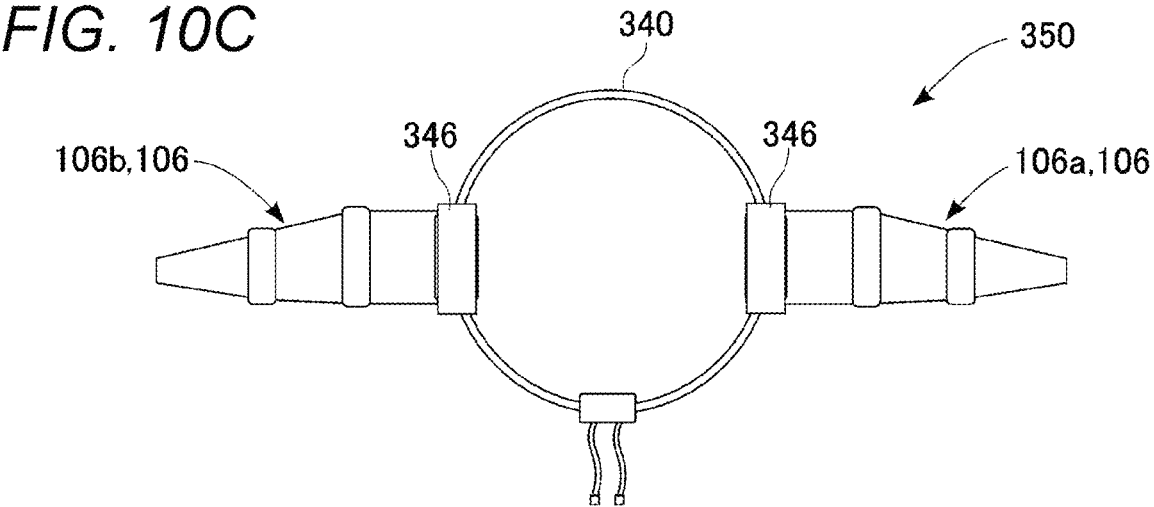

FIGS. 10A to 10C are drawings representing a configuration of the arm unit 350. FIG. 10A is a front view, FIG. 10B is a plan view, and FIG. 10C is a bottom view.

As shown in FIGS. 10A and 10B, the arm unit 350 is such that the pair of arm portions 106 (a left arm portion 106a and a right arm portion 106b) are provided on the annular member 340, which is circular in plan view. The left arm portion 106a and the right arm portion 106b are provided in positions with linear symmetry with respect to a central line of the annular member 340, and a connector unit 366 is disposed in a position deviating approximately 90 degrees toward a rear of the two.

A motor 362 is provided at a drive base end of the arm portion 106, configuring the first joint 352. As the motor 362 is fixed to the annular member 340, relative positions of the drive base ends of the pair of arm portions 106 do not change. The arm 356 is configured by an upper arm portion 353 and a front arm portion 357 being linked via a fixing hinge 355. A motor 364 is provided between the front arm portion 357 and the hand 358, configuring the second joint 354. The arm 356 can be raised and lowered by driving the motor 362, and the hand 358 can be moved (the wrist can be bent) by driving the motor 364. In the embodiment, an angle between the upper arm portion 353 and the front arm portion 357, that is, a degree to which the arm 356 bends, is kept constant using the fixing hinge 355. In a modified example, a configuration may be such that the degree to which the arm 356 bends can be controlled by, for example, providing a motor instead of the fixing hinge 355.

As shown in FIGS. 10B and 10C, a transverse section of the upper arm portion 353, the front arm portion 357, and the hand 358 is trapezoidal, whereby an outline can be provided with roundness when the arm portion 106 is covered with the outer skin 314. By a trapezoidal section being adopted in this way, a force when touching is dispersed more than when adopting a rectangular section. That is, when a user touches the arm portion through the outer skin 314, the user is unlikely to feel that a member of the robot exists, and a soft tactile sensation like that of a living being can be provided. A touch sensor omitted from the drawings is disposed between an upper face of the arm portion 106 and the outer skin 314.

A rectangular sliding member 346 is provided on a lower face of the annular member 340 in a position corresponding to the motor 362. The sliding member 346 is formed of a resin material with a low coefficient of friction. The arm unit 350 slides freely with respect to the trunk portion frame 318 owing to a left and right pair of the sliding member 346 being placed on upper end faces of a pair of side plates 336.

The annular member 340 is preferably formed of a resin material having flexibility, and more preferably configured of an elastic member like an elastomer. This means that even when the arm 356 is twisted by the robot 100 falling over or the like, the annular member 340 can release the force by bending, because of which the arm 356 is unlikely to break.

Wiring (power supply lines and signal lines) extending from the motors 362 and 364 and a touch sensor (omitted from the drawings) is concentrated in the connector unit 366 (refer to dotted lines). A multiple of connectors extend from the connector unit 366, and are connected to a circuit substrate (control circuit substrate, power supply circuit substrate) installed in the trunk portion frame 318.

Figure 11A:
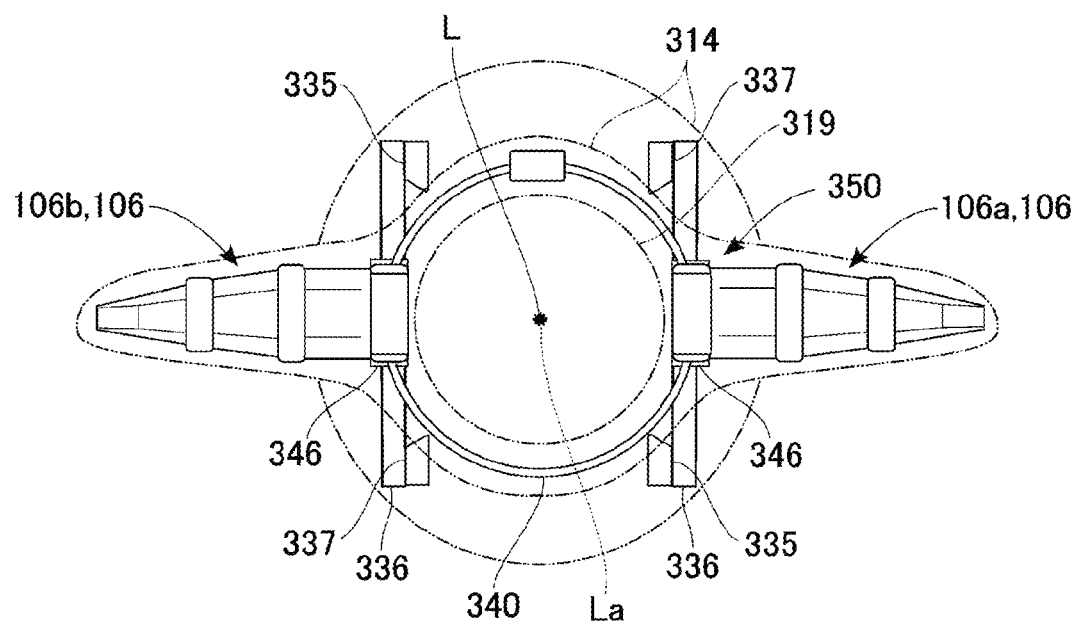
FIGS. 11A and 11B are schematic views representing an installation configuration and an operation of the arm unit.
Figure 11B:
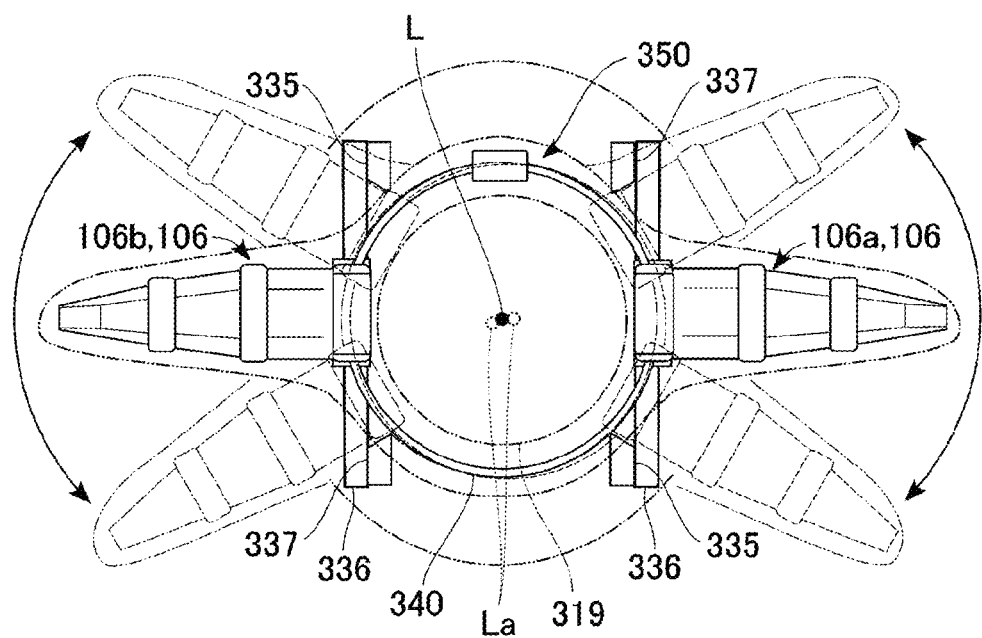
Figure 12A:
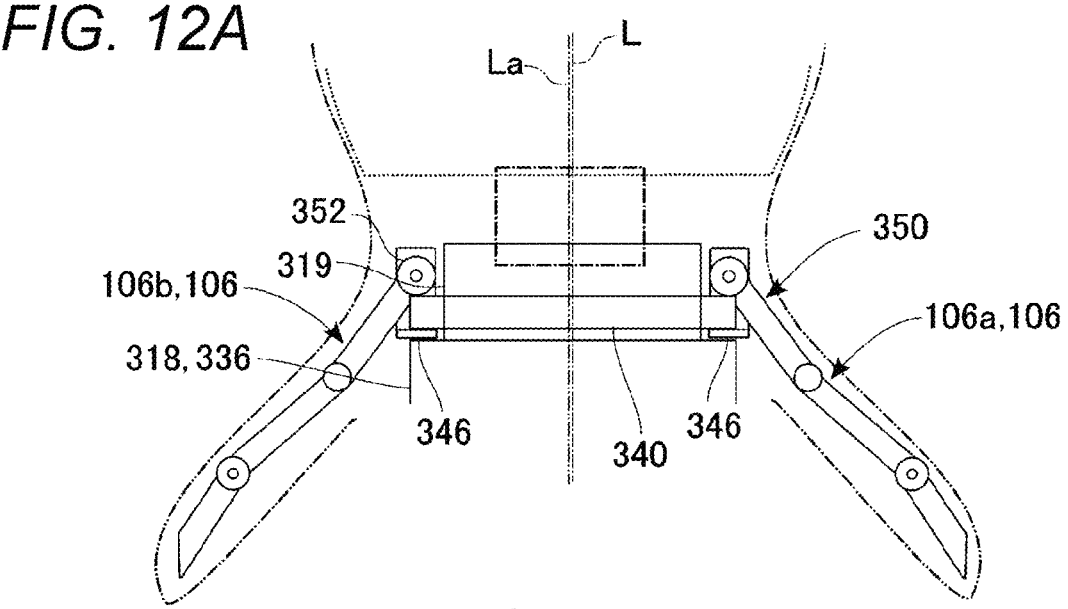
FIGS. 12A to 12C are schematic views representing an installation configuration and an operation of the arm unit.
Figure 12B:
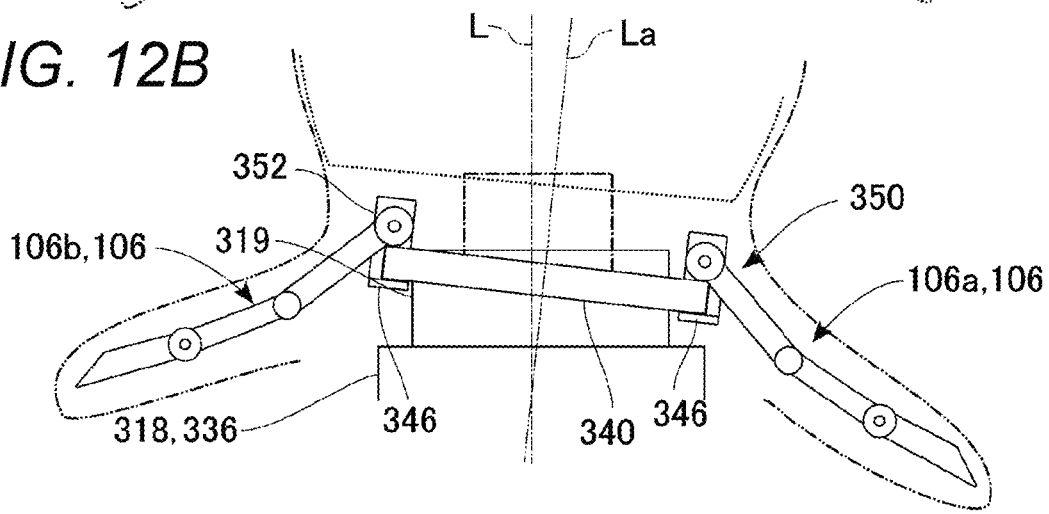
Figure 12C:
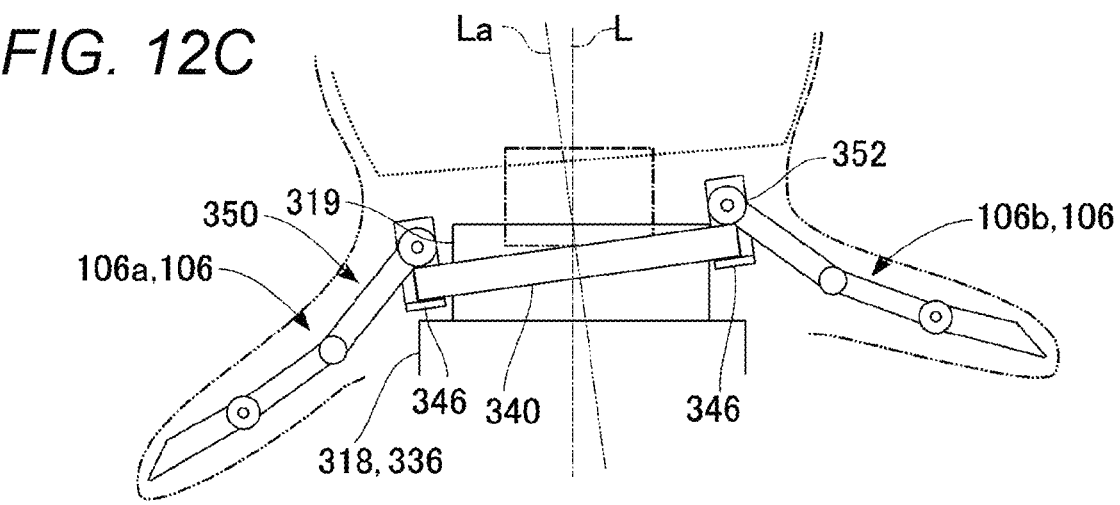

FIGS. 11A to 12C are schematic views representing an installation configuration and an operation of the arm unit 350. FIGS. 11A and 11B are plan views, and FIGS. 12A to 12C are front views. Each drawing shows an example of an operating process of the arm unit 350.

As shown in FIG. 11A, the pair of side plates 336 are provided practically in parallel, and the arm unit 350 is placed thereon across the pair of sliding members 346. The arm unit 350 can pivot centered on an axial line La (corresponding to a "virtual shaft") that passes through a center of the annular member 340. When the arm unit 350 pivots, the sliding member 346 slides over an upper end face of the side plate 336. A first stopper 335, which regulates a pivoting range of the arm unit 350 in one direction (clockwise in the drawing), and a second stopper 337, which regulates a pivoting range in the opposite direction (counterclockwise in the drawing), are provided on the pair of side plates 336.

The robot 100 does not have a configuration such that the arm unit 350 is electrically driven centered on the axial line La. As the outer skin 314 is mounted on both the head portion frame 316 and the arm unit 350, however, movement of the head portion frame 316 is transmitted to the arm unit 350 via the outer skin 314. For example, when the robot 100 looks back to the left or right from a state of facing the front, the head portion frame 316 pivots centered on an axial line L (corresponding to a "drive shaft") of the support portion 319 (herein, it is assumed that the yaw shaft 321 and the axial line L correspond). At this time, the pivoting of the head portion frame 316 is transmitted to the arm unit 350 by an elastic force of the outer skin 314. The arm unit 350 pivots centered on the axial line La of the annular member 340, and the pair of arm portions 106 follow the movement of the head portion.

In other words, the outer skin 314 has an elastic transformation region between the head portion frame 316 and the trunk portion frame 318, and the pair of arm portions 106 are disposed in the elastic transformation region. The outer skin 314 is mounted on the head portion frame 316 on one end side of the trunk portion frame 318, and is also mounted in the other end region of the trunk portion frame 318. Because of this, the outer skin 314 takes on a form wrapping a head portion and a buttocks portion of the robot 100, and tension of the elastic transformation region is maintained. Because of this, the elastic force (tensile force) of the outer skin 314 acts on the arm portion 106 in accompaniment to a displacement of the outer skin 314 (that is, a transformation of the elastic transformation region) that accords with an operation of the head portion frame 316. As a result of this, a relative displacement of the pair of arm portions 106 with respect to the trunk portion frame 318 changes, despite there being no accompanying electrical drive.

Herein, although the annular member 340 is coaxially fitted over the support portion 319, a sufficient gap (play) is provided between the two, as shown in the drawing. Because of this, the axial line La of the annular member 340 does not necessarily coincide with the axial line L of the support portion 319. When the robot 100 is in a state of facing the front, the two axial lines practically coincide, as shown in FIG. 11A. When the robot 100 looks back to the right or left, however, deviation between the two axial lines becomes greater the greater a pivoting angle of the arm unit 350, as shown in FIG. 11B.

When the robot 100 looks a long way back, the arm unit 350 is locked by the first stopper 335 or the second stopper 337 at a point at which the arm unit has pivoted by a predetermined angle (30 degrees in the embodiment). Meanwhile, as the outer skin 314 is twisted by the robot 100 looking back, the greater the angle of looking back, the greater an elastic reaction against the twisting of the outer skin 314 becomes. This means that when the angle at which the robot 100 looks back is equal to or less than a predetermined upper limit angle for following, the arm unit 350 is stopped, with the elastic reaction as a factor, without reaching the predetermined angle.

As shown in FIG. 12A, the arm unit 350 is simply placed on the side plates 336 in the positions of the pair of sliding members 346, and is not restricted in the axial direction. This means that when, for example, the robot 100 performs an action of tilting the head to the left or right, as shown in FIGS. 12B and 12C, the outer skin 314 pulls up one first joint 352 in accordance with the angle of the head portion frame 316. That is, a floating structure of the arm unit 350 with respect to the trunk portion frame 318 is realized by the elastic force of the outer skin 314. At this time, heights of the left and right shoulders change so as to differ in accordance with the angle of the head portion. This coincides with animal-like behavior. The greater the angle to which the head portion is tilted, the greater the deviation between the axial line La of the annular member 340 and the axial line L of the support portion 319.

Next, a drainage structure provided in the robot head portion will be described.

Figure 13A:
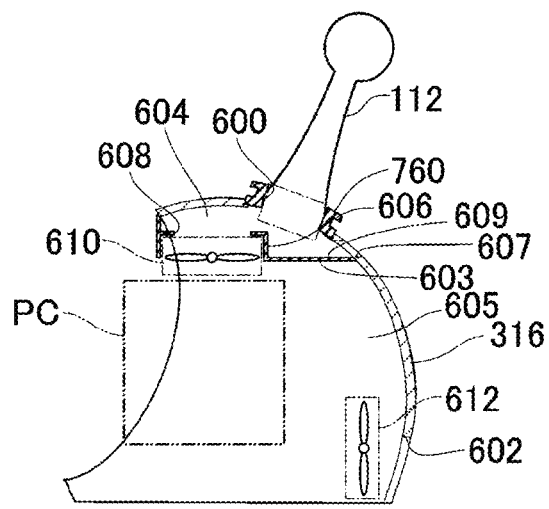
FIGS. 13A to 13C are schematic views representing a drainage structure.
Figure 13B:
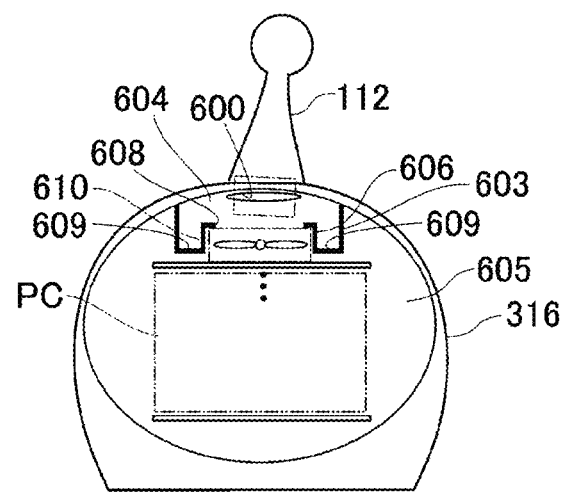
Figure 13C:
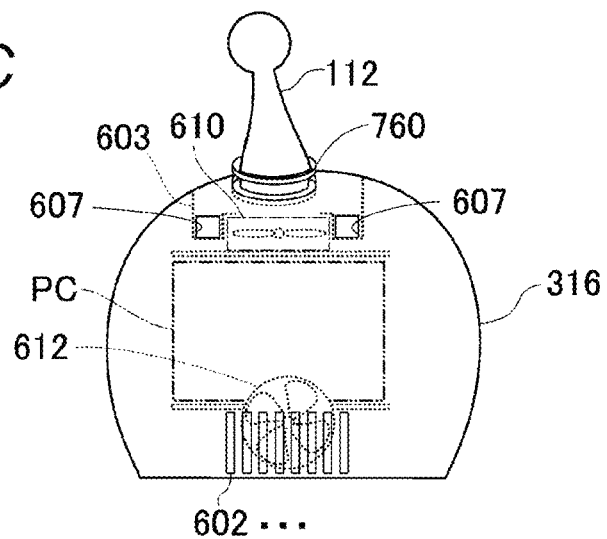

FIGS. 13A to 13C are schematic views representing a drainage structure, and show a state in which the head portion frame 316 to the face member 712 have been removed in order to facilitate the description. FIG. 13A is a side sectional view, FIG. 13B is a front view, and FIG. 13C is a back view.

As shown in FIGS. 13A and 13B, a multiple of control circuit substrates PC are disposed in an interior of the head portion frame 316, forming a cause of heat generation. Therefore, an intake port is provided in a head apex portion and an exhaust port is provided in a back head portion, and an intake fan and an exhaust fan are provided in a passage connecting the intake port and the exhaust port, whereby cooling using external air is carried out. Specifically, an annular intake port 600 is provided on an inner side of the guide 760, and a slit-form exhaust port 602 is provided in a lower rear portion of the head portion frame 316. A partition 603 is provided in an upper portion inside the head portion frame 316, whereby an external air introduction chamber 604 above the partition 603 and a housing chamber 605 below the partition 603 are demarcated. Functional parts of the control circuit substrate PC and the like are housed in the housing chamber 605.

A step 606 is provided in a front half portion of the partition 603, and portions to the left, right, and behind the step 606 are lower, forming a groove for drainage (a drainage groove 609). A region behind the step 606 is inclined toward the left and right drainage grooves 609. Meanwhile, a ventilation aperture portion 608 is provided in an upper face of the step 606. An intake fan 610 is disposed directly below the aperture portion 608 inside the step 606. A lower end aperture portion (the intake port 600) of the guide 760 is positioned so as to deviate backward from the step 606. This means that even supposing that liquid encroaches from the exterior along the guide 760, the liquid is dripped behind the step 606 without being led into the aperture portion 608. That is, the liquid is prevented from encroaching into the housing chamber 605.

As shown in FIGS. 13A and 13C, a left and right pair of discharge ports 607 are provided in the back of the head portion frame 316. The discharge port 607 communicates with the external air introduction chamber 604. In the embodiment, a bottom face of the drainage groove 609 is in a positional relationship of being flush with a bottom face of the discharge port 607. An exhaust fan 612 is disposed in a position opposing the exhaust port 602 in a lower rear portion inside the head portion frame 316. Because of this, a ventilation passage is formed between the intake fan 610 and the exhaust fan 612, and the control circuit substrate PC is positioned in the ventilation passage.

Figure 14A:
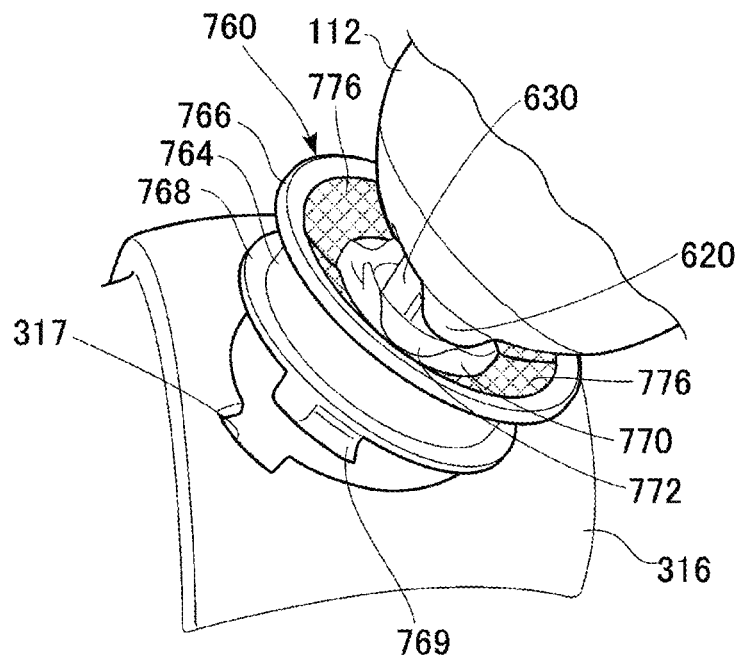
FIGS. 14A and 14B are illustrations representing a structure of a connection portion of a head portion and a horn.
Figure 14B:
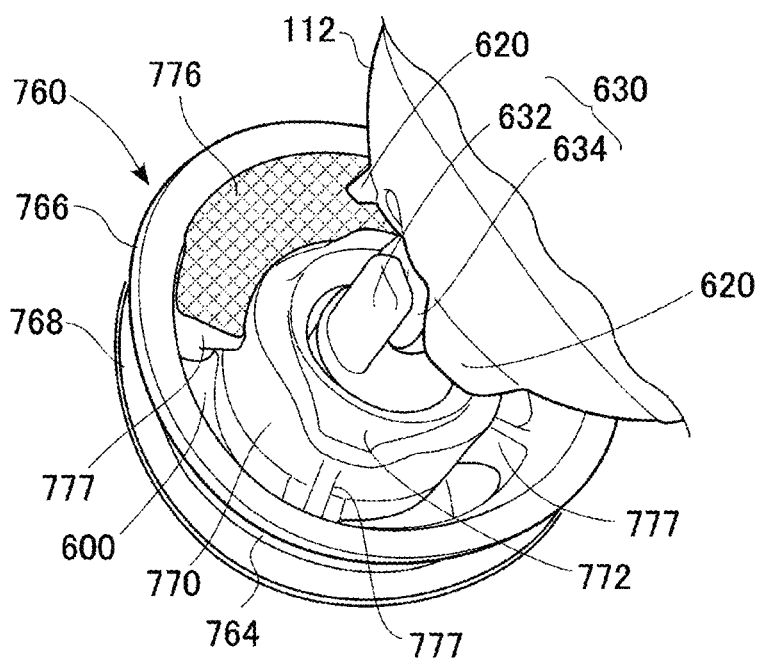

FIGS. 14A and 14B are illustrations representing a structure of a connection portion of the head portion and the horn 112. FIG. 14A shows a fitting structure of the horn 112 and the head portion frame 316 (a state in which the horn 112 has been removed from the head portion frame 316). FIG. 14B shows a filter attachment structure.

As shown in FIG. 14A, the guide 760 has a cylindrical guide main body 764, an upper flange 766 provided at an upper end of the guide main body 764, and a lower flange 768 provided at a lower end of the guide main body 764. A protruding fitting portion 769 is provided in a peripheral edge portion of the lower flange 768. The protruding fitting portion 769 protrudes in a radial direction of the lower flange 768, and has a step in a circumferential direction. A recessed fitting portion 317 of a form complementary to that of the protruding fitting portion 769 is provided in the head portion frame 316. By the protruding fitting portion 769 being fitted into the recessed fitting portion 317, and the guide 760 being caused to rotate around the axial line, the guide 760 can be fixed to the head portion frame 316. The lower flange 768 is in close contact with a surface of the head portion frame 316, and performs a sealing function at an interface thereof.

As shown in FIG. 14B, a cylindrical support portion 770 is provided concentrically inside the guide main body 764. The guide main body 764 and the support portion 770 are linked by a multiple of linking portions 777 extending in a radial direction between the two. The intake port 600 is configured of a gap formed between neighboring linking portions 777.

A dust-preventing filter 776 is removably attached to an entrance of the intake port 600. The filter 776 is of a fan form whose central angle is approximately 120 degrees, and a size of a mesh of the filter 776 is set to an extent such that a dust preventing function can be performed without losing ventilation. Three filters 776 are disposed in an annular form.

A joint mechanism 630 is inserted through an inner side of the support portion 770. The joint mechanism 630 includes a first member 632, which extends from the head portion frame 316, and a second member 634, which extends from the horn 112. The second member 634 can slide in a direction toward or away from the first member 632. A multiple of projections 620 are disposed in an annular form in a lower end portion of the horn 112. A multiple of recessed portions 772 of a form complementary to that of the projections 620 are provided in the support portion 770. By bringing the second member 634 into proximity with the first member 632, and fitting the projection 620 into the recessed portion 772, the horn 112 can be fixed to the head portion frame 316.

Even though the horn 112 is fixed in this way, the filter 776 is exposed between the horn 112 and the guide 760, because of which external air can be introduced into the head portion frame 316. Meanwhile, due to this kind of configuration, there is a possibility of liquid from the exterior passing through the filter 776, and encroaching into the head portion frame 316. For example, a case in which a user spills a drink on a table, and the liquid falls on the robot 100 directly below, is envisaged. Even when the liquid encroaches into the external air introduction chamber 604 through the filter 776 in such a case, a drainage structure that does not allow the liquid to encroach into the housing chamber 605 is provided.

Figure 15A:
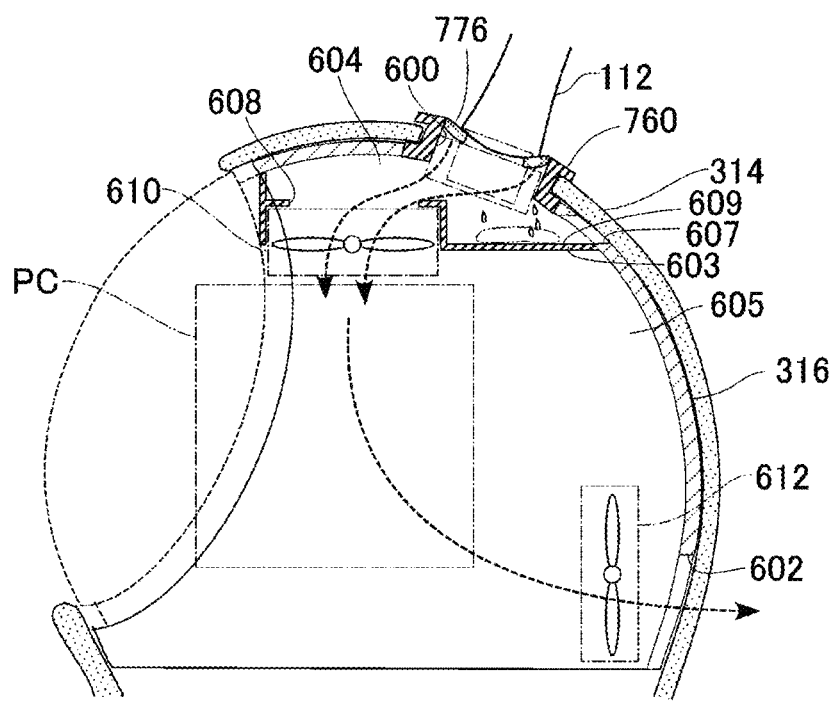
FIGS. 15A and 15B are illustrations representing a head portion drainage structure.
Figure 15B:
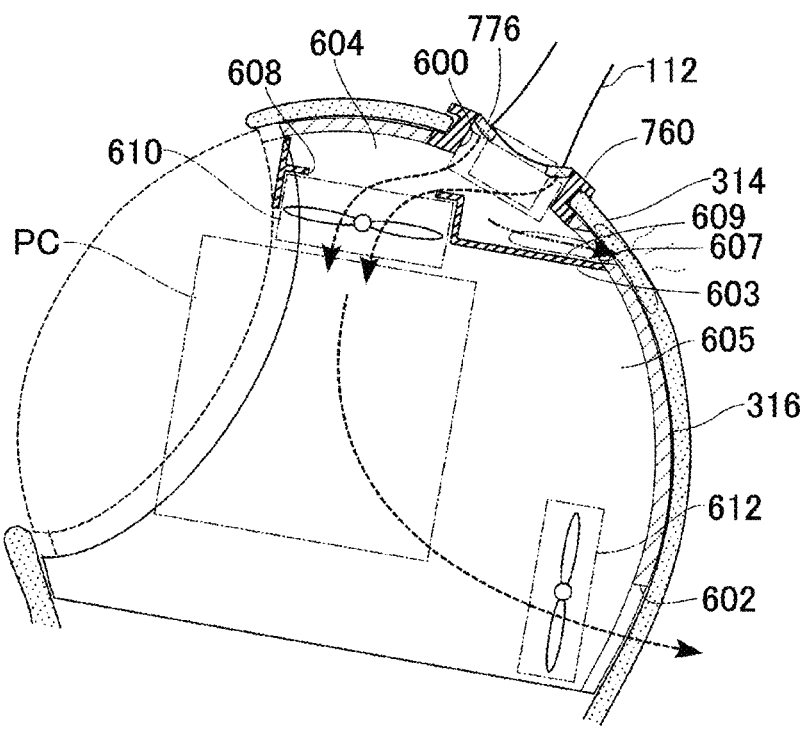

FIGS. 15A and 15B are illustrations representing the head portion drainage structure. FIG. 15A shows a state in which the robot is facing straight ahead (in a horizontal direction), and FIG. 15B shows a state in which the robot is looking upward. A dotted line in the drawings indicates a flow of air, and a dashed line indicates a flow of droplets.

During an operation of the robot 100, the fans 610 and 612 are driven, and cooling using ventilation is carried out. That is, external air introduced into the external air introduction chamber 604 from the intake port 600 is introduced into the housing chamber 605 via the aperture portion 608, cools a heat generating part (functional part) such as the control circuit substrate PC, and is discharged from the exhaust port 602.

At this time, even supposing that liquid encroaches into the external air introduction chamber 604 as shown in FIG. 15A, the liquid accumulates in a lower portion of the external air introduction chamber 604 (refer to a two-dot chain line), without reaching the aperture portion 608. Subsequently, when the robot 100 looks upward as shown in FIG. 15B, the liquid flows backward along the drainage groove 609, and is discharged from the discharge port 607. The liquid is absorbed in a rear head portion peripheral region of the outer skin 314, and evaporates. In particular, air warmed by ventilation heats a rear head portion peripheral position of the outer skin 314, because of which evaporation of the liquid is promoted.

Next, a structure of a protective member provided in an abdominal portion and a back portion of the robot will be described.

Figure 16A:
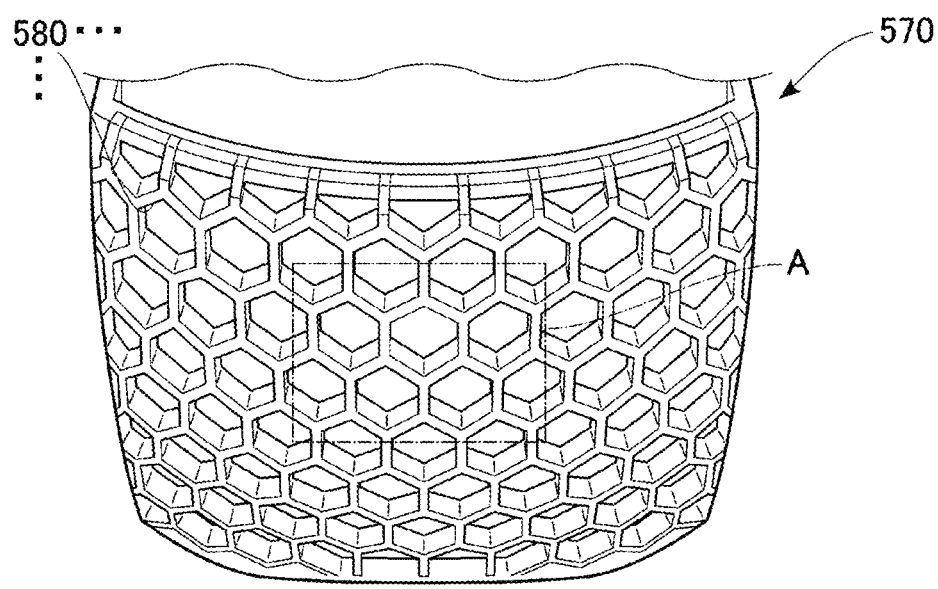
FIGS. 16A and 16B are drawings representing a structure of a protective member.
Figure 16B:
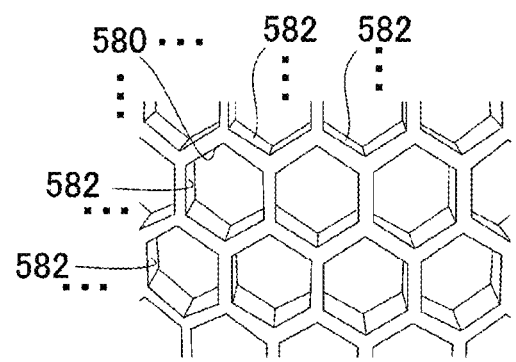

FIGS. 16A and 16B are drawings representing a structure of a protective member 570. FIG. 16A is a perspective view in which the protective member 570 is seen from slightly above, and FIG. 16B is an enlarged front view of an A portion of FIG. 16A.

As shown in FIG. 16A, the protective member 570 of the abdominal portion is of an arch form in plan view, and has a honeycomb structure in which a large number of hexagonal holes 580 (aperture portions) are formed in frontal view. The protective member 570 is formed of a material that is softer than a general purpose plastic, such as a thermoplastic elastomer.

As shown in FIG. 16B, wall faces forming the hole 580 are configured so as to incline from top to bottom and left to right in frontal view. More specifically, top and bottom wall faces 582 defining the hole 580 incline upward toward a back. Also, left and right wall faces 584 incline farther left toward the back the nearer to a right peripheral edge, and incline farther right toward the back the nearer to a left peripheral edge. By the hole form being caused to incline in this way, the wall portion collapses easily when pressure acts from a front side, and the protective member 570 bends easily as a whole. By the material and the form of the protective member 570 being carefully considered in this way, a soft and pleasant tactile sensation can be provided when a user lifts and hugs the robot 100. Also, a substrate on which a touch sensor is mounted is disposed on an inner side of the protective member 570, whereby a touch by a user is detected. That is, the trunk (abdominal) portion of the robot 100 is a place that frequently comes into contact with a portion of a person's body when the person hugs the robot 100, because of which flexibility is required. In addition to this, an aspect of a touch also needs to be detected accurately, because of which a touch sensor with high reproductive accuracy is provided. The touch sensor can be protected from an outer side by being covered with the protective member 570.

Also, by adopting a honeycomb structure (porous structure) for the protective member 570, the outer skin 314 can be warmed while heat emitted from inside the trunk portion frame 318 is released. As a result of this, a user can be caused to feel warmth (a body temperature) of the robot 100 when lifting and hugging the robot 100. By adopting a honeycomb structure, a balance can be achieved between reducing weight and maintaining strength. The protective member 572 of the back portion has the same honeycomb structure, but a description thereof will be omitted.

The robot 100 has been described based on an embodiment. According to the embodiment, the relative displacement of the pair of arm portions 106 with respect to the trunk portion changes in accompaniment to a displacement of the outer skin 314 that accords with an operation of the head portion. That is, a following movement of the arm portion 106 is realized by utilizing the elastic force of the flexible outer skin 314, rather than by an electrical control of a drive mechanism of the arm portion 106. Because of this, the shoulder naturally follows in accordance with a twisting of the body of the robot 100, whereby animal-like behavior can be realized. Also, as the outer skin 314 is an elastic body, a moderate elastic transformation occurs when the robot 100 moves the head portion, whereby a realistic twisting of the body can be performed. In particular, a motion of looking back can be performed with no appearance of unnaturalness by a robot that does not have a structure in which a trunk portion is twisted with respect to a lower limb, as is the case in the embodiment.

The invention not being limited to the heretofore described embodiment and modified examples, components can be modified and embodied without departing from the scope of the invention. Various inventions may be formed by combining a multiple of components disclosed in the embodiment and modified examples as appropriate. Also, some components from among all components presented in the embodiment and modified examples may be omitted.

A robot including a trunk portion as a "base portion", a head portion as a "first movable portion", and an arm portion as a "second movable portion" is presented as an example in the embodiment. In a modified example, a combination of other regions in the robot may be employed by, for example, adopting a trunk portion lower half portion (from an abdominal portion down) as the "base portion", a head portion as the "first movable portion", and a trunk portion upper half portion (from a chest portion up) as the "second movable portion".

In the embodiment, each operation of the "first movable portion" and the "second movable portion" is individually controlled by a control unit (the operation control unit 152). Meanwhile, a displacement of the first movable portion is transmitted via an outer skin (a linking member) to the second movable portion owing to a physical structure, and the second movable portion is displaced with no relation to a control by the control unit. More specifically, a unit (arm unit) is configured by a multiple of second movable portions being supported by an annular member. The control unit controls a fine movement of each second movable portion in the unit, but does not control a large movement of the unit as a whole. A large movement of the unit as a whole is realized by utilizing the flexible outer skin. In a modified example, at least either one of a first movable portion and a second movable portion may be driven with no accompanying control. For example, the relevant portion may receive an external force (disturbance), and move due to inertia. A configuration may be such that the first movable portion is controlled by the control unit, and the second movable portion is not controlled. A configuration may be such that the second movable portion does not have a portion that is driven by an actuator. When the second movable portion is formed of an arm and a joint thereof, as in the embodiment, the second movable portion may be a member linking structure (a simple mechanism) that does not have a motor or the like that drives the joint.

In the embodiment, a drainage structure provided in the robot head portion has been described. When a gap is formed in the robot head apex portion in order to secure robot ventilation and other functions, this kind of drainage structure can answer a problem of securing waterproofing of an internal electronic part. The drainage structure is also effective in a structure in which a gap is formed in an upper face position when the robot is not driven upright, such as when causing the robot to walk on all fours. For example, a case in which a gap is formed in a base end of a tail of an animal-type robot is applicable.

A robot having this kind of drainage structure can also be described as follows. A robot characterized by including a frame, a first aperture portion provided in the frame and opening upward, an outer skin having hygroscopicity that covers the frame without interfering with the first aperture portion, a partition that separates an interior of the frame into a first chamber that communicates with the first aperture portion and a second chamber that houses a functional part, and a second aperture portion that opens in a position in the frame lower than that of the first aperture portion, communicates with the first chamber, and is covered with the outer skin.

Herein, a "functioning part" means a part for which waterproofing is needed, such as an electrical circuit part. The first chamber and the second aperture portion can be caused to communicate via a drainage groove. In the embodiment, the head portion frame 316 corresponds to the "frame", and the intake port 600 corresponds to the "first aperture portion". Also, the external air introduction chamber 604 corresponds to the "first chamber", the housing chamber 605 corresponds to the "second chamber", and the discharge port 607 corresponds to the "second aperture portion".

The robot may have a step in the first chamber, and include a third aperture portion that causes the first chamber and the second chamber to communicate in an upper portion of the step. The second aperture portion is in a position lower than that of the third aperture portion when the robot has a steady posture (a state in which the robot is facing straight ahead, a waiting state, or the like). In the embodiment, the aperture portion 608 corresponds to the "third aperture portion". This kind of configuration is such that even supposing that liquid encroaches from the first aperture portion, the liquid accumulates in a bottom portion of the first chamber. The liquid can be discharged via the second aperture portion, and caused to be absorbed by the outer skin.

A liquid encroachment detecting sensor that detects an encroachment of liquid into the first chamber may be provided. The liquid encroachment detecting sensor detects a "liquid encroachment" when a height of liquid accumulated in the bottom portion of the first chamber reaches a set height or greater. The "set height" may be a predetermined ratio (%) of a height of the step. When a liquid encroachment is detected, the control unit controls a motion of the robot so that the frame is not caused to incline in a direction such that the third aperture portion becomes relatively low (a direction such that the second aperture portion becomes relatively high). Because of this, the liquid can be prevented from encroaching into the second chamber via the third aperture portion. At this time, a motion of the robot is preferably selected so that the frame is actively caused to incline in a direction such that the third aperture portion becomes relatively high (a direction such that the second aperture portion becomes relatively low).

To describe with the embodiment as an example, the operation control unit 222 carries out a control of inclining the head portion frame 316 to the rear in order to promote drainage from the discharge port 607 when the liquid encroachment detecting sensor detects an encroachment of liquid into the external air introduction chamber 604. While liquid is encroaching, the operation control unit 222 does not execute a motion of inclining the head portion frame 316 to the front (cancels a selection of that kind of motion), in order that liquid does not encroach from the aperture portion 608. When detection of a liquid encroachment by the liquid encroachment detecting sensor stops owing to the state of liquid encroachment being eliminated, the operation control unit 222 allows a motion of inclining the head portion frame 316 to the front to be selected.

In the embodiment, a honeycomb structure (porous structure) of a protective member provided in an abdominal portion and a back portion of the robot is described. This kind of porous structure realizes a soft tactile sensation of the robot, or can answer a problem such as transmitting warmth of the robot. The honeycomb structure can be applied not only to the abdominal portion and the back portion, but also to a region of the robot in which such a function is required.

A robot having this kind of porous structure can also be described as follows. A robot characterized by including a frame, a protective member provided on a side face of the frame, and a flexible outer skin that covers the frame from an outer side of the protective member, wherein the protective member has a porous structure formed of a flexible material.

Herein, the "porous structure" may be a honeycomb structure, as in the embodiment. In this case, a multiple of wall portions forming the honeycomb structure preferably have a form that inclines toward the back. In the embodiment, a honeycomb form is presented as an example of the porous structure of the protective members 570 and 572, but a lattice form, a mesh form, or other porous form may be employed.

In the embodiment, the cover 312 is configured of rubber, but the same material as that of the protective members 570 and 572 may be employed.

In the embodiment, a configuration such that the robot has wheels as a "movement mechanism" is presented as an example. In a modified example, a configuration may be such that the "movement mechanism" is a leg portion, and the robot can walk.

Although not mentioned in the embodiment, a touch sensor may be disposed on an inner side of the back head portion of the head portion frame 316. In this case, as an inner face of the head portion frame 316 is spherical (a concave face), an interval between the surface of the head portion frame 316 and the touch sensor increases when a touch sensor substrate is of a flat plate form, and there is a possibility of sufficient sensitivity not being obtained. Therefore, in a modified example, a touch sensor substrate may be a flexible substrate formed of a flexible resin, and be disposed curved so as to be convex facing the inner face side of the head portion frame 316. Note that the flexible substrate only bends in one direction (a longitudinal direction), because of which bringing the flexible substrate into contact along the concave face of the head portion frame 316 is difficult. When attempting to forcibly affix the substrate to the concave face, there is concern that a touch sensor electrode will become distorted, causing sensor accuracy to decrease. In the modified example, therefore, a multiple of ribs are arrayed protruding on the inner face (concave face) of the head portion frame 316. An arc-form curved face (concave face) is formed by leading end faces of the ribs, and adopted as a mounting face. By the flexible substrate being affixed along the mounting face, a convex form facing the inner face side of the head portion frame 316 can be realized. By configuring in this way, sensitivity is maintained by the touch sensor being brought close to the surface of the head portion frame 316, and detection accuracy can also be maintained.

Although not mentioned in the embodiment, a fall determination unit that determines that the robot has fallen may be included. The fall determination unit may determine that a fall has occurred based on, for example, a value detected by the acceleration sensor. When it is determined that a fall has occurred while the robot is traveling, the wheel 102 may be housed in the cover 312 before the robot collides with the floor surface, thereby absorbing shock. Also, when it is determined that a fall has occurred from a hugged state, the wheel 102 may be housed in the cover 312 before the robot collides with the floor surface, thereby absorbing shock. In particular, damage to the wheel 102 can be prevented or reduced in a structure that does not have a shock absorber (a spring or the like) in a wheel support portion, as is the case in the embodiment.

Although not mentioned in the embodiment, the annular member configuring the arm unit may include a housing portion that houses a motor. Also, although the annular member is configured of a single member in the embodiment, the annular member may be configured by a multiple of members being assembled. Not being limited to a circular form in plan view, the annular member may have a polygonal form in plan view, such as an octagonal form in plan view.

Figure 17A:
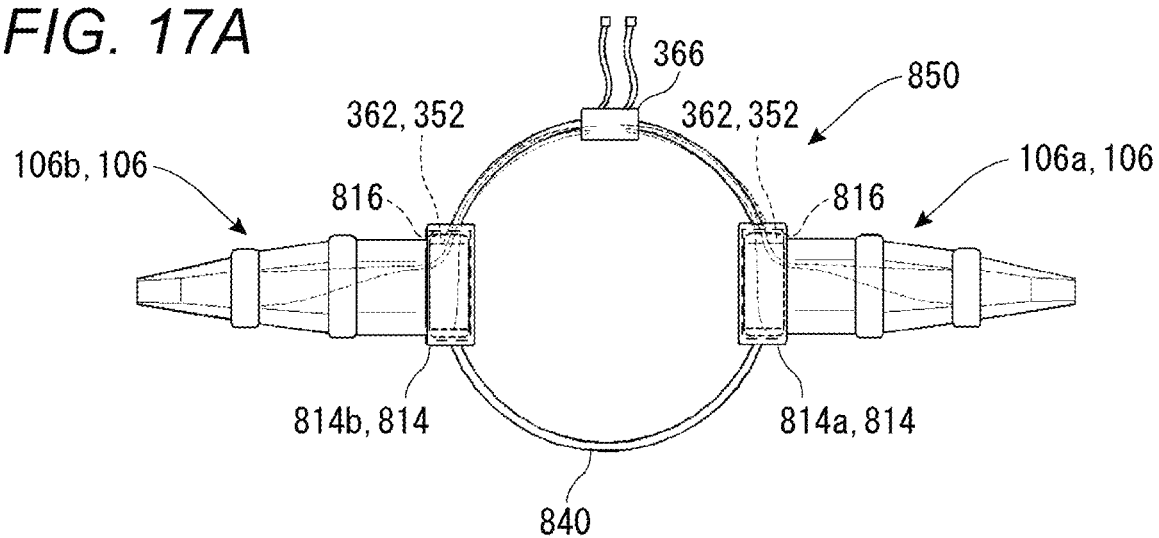
FIGS. 17A to 17E are drawings representing an arm unit and constituent parts thereof according to a modified example.
Figure 17B:
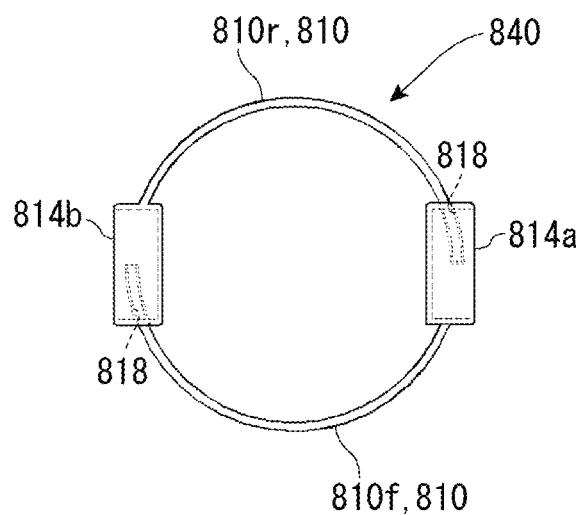
Figure 17D:
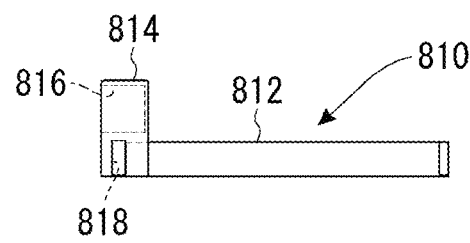
Figure 17C:
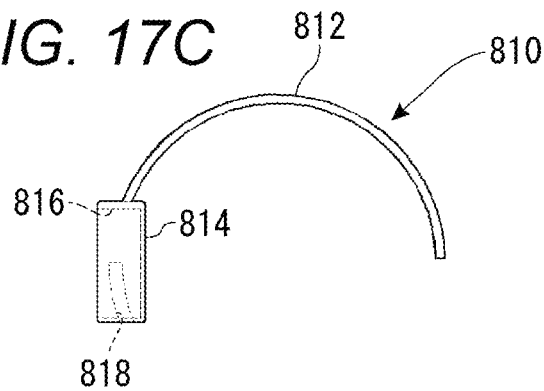
Figure 17E:
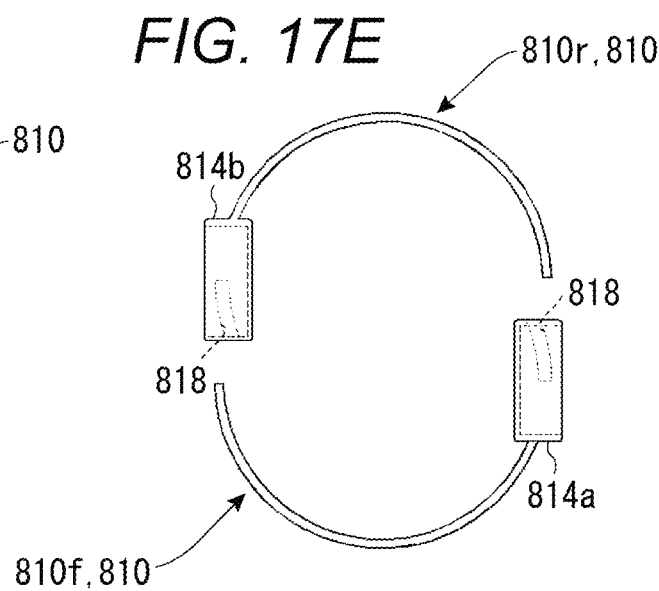

FIGS. 17A to 17E are drawings representing an arm unit and constituent parts thereof according to a modified example. FIG. 17A is a plan view of the arm unit. FIG. 17B is a plan view of an annular member configuring the arm unit. FIGS. 17C and 17D show a semi-annular member configuring the annular member. FIG. 17C is a plan view, and FIG. 17D is a front view. FIG. 17E is an exploded view of the annular member.

As shown in FIG. 17A, an arm unit 850 is configured by the pair of arm portions 106 being attached to an annular member 840. As shown in FIG. 17B, the annular member 840 is configured by two semi-annular members 810 (a front side semi-annular member 810f and a rear side semi-annular member 810r) that are semi-circular in plan view being attached at the front and rear. The front side semi-annular member 810f and the rear side semi-annular member 810r have a common structure (the same structure in the modified example).

As shown in FIGS. 17C and 17D, the semi-annular member 810 has a cuboid housing portion 814 integrated with one end of a belt-form main body 812. The semi-annular member 810 is such that the main body 812 and the housing portion 814 are integrally molded by injection molding, or the like, of a resin material. The motor 362 is housed in the housing portion 814. An upper half portion side face of the housing portion 814 opens outward in a radial direction of the semi-annular member 810, forming a housing port 816 of the first joint 352 of the arm portion 106 and the motor 362. A first housing portion 814a is provided at one end of the front side semi-annular member 810f, and a second housing portion 814b is provided at one end of the rear side semi-annular member 810r. Also, a fitting hole 818 extending in a longitudinal direction (circumferential direction) of the semi-annular member 810 is opened in a lower half portion end face of the housing portion 814.

As shown in FIGS. 17E and 17B, the front side semi-annular member 810f and the rear side semi-annular member 810r are attached at the front and rear. At this time, an other end portion (an end portion on the side opposite to the housing portion 814) of the main body 812 of each semi-annular member is inserted into the fitting hole 818 of the other semi-annular member. That is, the front side semi-annular member 810f and the rear side semi-annular member 810r are attached with mutually opposite orientations and fixed, whereby the annular member 840 is obtained. Further, the left arm portion 106a is attached to the motor 362 housed in the first housing portion 814a. The right arm portion 106b is attached to the motor 362 housed in the second housing portion 814b. The arm unit 850 can be configured by both arm portions 106 being attached to the annular member 840, and then by the connector unit 366 being attached. A lower face of the housing portion 814 functions as the "sliding member 346" of the embodiment.

According to the modified example, the housing portion 814 is molded integrally with the annular member 840, whereby the number of parts is reduced, and durability can be increased. Also, by adopting the same structure for the pair of semi-annular members 810 configuring the annular member 840, standardization of parts can be realized, and manufacturing cost can be reduced.

Alternatively, a configuration in which a pair of arm portions are not integrated by a linking member such as an annular member may be adopted. Specifically, a left arm unit, in which a left arm and a first housing portion are integrated, and a right arm unit, in which a right arm and a second housing portion are integrated, may be provided independently, and each housing unit fixed to an outer skin by sewing or the like. There are bag-form arm housing portions (a left arm housing portion and a right arm housing portion) on the left and right of the outer skin. The left arm may be housed in the left arm housing portion, and the first housing portion fixed in a vicinity of an entrance of the left arm housing portion in the outer skin. The right arm may be housed in the right arm housing portion, and the second housing portion may be fixed in a vicinity of an entrance of the right arm housing portion in the outer skin. According to this kind of configuration too, the relative displacement of the pair of arm portions with respect to the trunk portion changes owing to an elastic transformation of the outer skin that accords with an operation of the head portion, and animal-like behavior can be realized. A conceptualization of this kind of configuration is as follows. A pair of second movable portions are supported by first and second support members respectively. The first support member and the second support member are provided in such a way as to enclose a periphery of a base portion, and each is supported by the outer skin. When there is a single second movable portion, a single support member is sufficient.

Although not mentioned in the embodiment, a structure or a configuration in which an arm portion (arm unit) displaced together with an outer skin transformation that accords with an operation of a head portion is biased in a direction such as to return to an original state (a reference position) may be provided. The outer skin is formed of an elastic material, meaning that when the head portion returns from a looking back operation, or the like, and looks straight ahead, the outer skin attempts to return to the state before transformation. However, no drive force that reverses the displacement acts on the arm unit, because of which there is a possibility of resistance to the outer skin returning to the original state caused by sliding, catching, or the like when the arm unit returns to the reference position. Therefore, a biasing mechanism, such as a spring, that biases the arm unit toward the front (a position in which the pivoting angle is zero: refer to a thick line state in FIG. 11B) may be provided. By so doing, a return of the outer skin to the original state can be promoted. Alternatively, a biasing structure such as sewing an elastic wire for maintaining form into the outer skin may be provided. That is, a biasing mechanism, such as an elastic body, that biases the outer skin or the first movable portion toward a reference position may be provided, thereby facilitating a return of the outer skin and the second movable portion to a reference state in accordance with an operation of the first movable portion being stopped.

In the embodiment, as shown in FIGS. 11A and 11B, an inner diameter of the annular member 340 is greater than the outer diameter of the support portion 319, and the annular member 340 is fitted loosely over the support portion 319. Because of this, not only pivoting but also tilting of the annular member 340 with respect to the support portion 319 is easy. A result of this is that when an operation of the head portion is transmitted to the arm portion via the outer skin, the arm portion easily follows the movement of the head portion. That is, by the annular member by which the second movable portion is supported being loosely fitted on (fitted over) the base portion, the first movable portion can be caused to pivot or caused to tilt with respect to the base portion. Because of this, the second movable portion is easily caused to follow the movement of the first movable portion.

What is claimed is:

1. A robot, comprising:
   a base portion;
   a first movable portion supported by the base portion;
   a flexible outer skin provided in such a way as to come into contact with the first movable portion and cover the base portion, wherein movement of the first moveable portion is configured to move the flexible outer skin; and
   a second movable portion, provided in contact with the outer skin, wherein the second moveable portion is configured to be displaced with respect to the base portion as a result of movement of the flexible outer skin in response to movement of the first movable portion.

2. The robot according to claim 1, wherein the flexible outer skin has an elastic transformation region between the first movable portion and the base portion, and
   the second movable portion contacts the elastic transformation region.

3. The robot according to claim 1, wherein the flexible outer skin is displaced in accordance with an operation centered on a drive shaft of the first movable portion, and
   a deviation between a virtual shaft, fixed relative to a position of the second moveable portion, and the drive shaft increases as a magnitude of movement of the flexible outer skin increases.

4. The robot according to claim 1, further comprising a third movable portion, wherein
   the third moveable portion is connected to the second moveable portion to maintain a relative position between the second moveable portion and the third moveable portion.

5. The robot according to claim 4, further comprising an annular member connecting the second moveable portion to the third moveable portion.

6. The robot according to claim 5, wherein the second moveable portion corresponds to a left arm of the robot, and the third moveable portion corresponds to a right arm of the robot.

7. The robot according to claim 5, wherein the annular member surrounds a periphery of the base portion.

8. The robot according to claim 1, wherein the flexible outer skin is mounted on the first movable portion, and in a region in the base portion on a side opposite to that of the first movable portion.

9. The robot according to claim 1, wherein
   the base portion comprises:
      a cylindrical support portion fixed to an upper portion of the base portion, and
      a side plate, wherein a diameter of the side plate is greater than a diameter of the cylindrical support portion,
   the second movable portion is supported by an annular member, and
   the annular member is configured to fit over the cylindrical support portion, and sit on the side plate.

10. The robot according to claim 9, wherein the annular member fitted over the support portion is spaced from the support portion by a gap.

11. The robot according to claim 1, wherein the first movable portion is a head portion having a facial region.

12. The robot according to claim 1, wherein the second movable portion is linked to a base end of a member configured to attach to the base portion so as to be relatively displaceable, and the second movable portion is displaceable by a motor in the base end.

13. A robot, comprising:
   a base portion;
   a first movable portion supported by the base portion;
   a flexible outer skin provided in such a way as to come into contact with the first movable portion and cover the base portion, wherein movement of the first moveable portion is configured to move the flexible outer skin;
   a second movable portion, provided in contact with the outer skin; and
   an annular member configured to support the second moveable portion, wherein the annular member is configured to surround a section of the base portion, wherein the annular member is configured to be displaced with respect to the base portion as a result of movement of the flexible outer skin in response to movement of the first movable portion.

14. The robot according to claim 13, wherein the flexible outer skin has an elastic transformation region between the first movable portion and the base portion, and
   the second movable portion contacts the elastic transformation region.

15. The robot according to claim 13, wherein the flexible outer skin is displaced in accordance with an operation centered on a drive shaft of the first movable portion, and
   a deviation between a virtual shaft, extending through a center of the annular member, and the drive shaft increases as a magnitude of movement of the flexible outer skin increases.

16. The robot according to claim 13, wherein
   the base portion comprises:
      a cylindrical support portion fixed to an upper portion of the base portion, and
      a side plate, wherein a diameter of the side plate is greater than a diameter of the cylindrical support portion, and
   the annular member is configured to fit over the cylindrical support portion, and sit on the side plate.

17. The robot according to claim 16, wherein the annular member fitted over the support portion is spaced from the support portion by a gap.

18. The robot according to claim 13, wherein the first movable portion is a head portion having a facial region.

19. The robot according to claim 13, wherein the second movable portion is linked to a base end of a member configured to attach to the base portion so as to be relatively displaceable, and the second movable portion is displaceable by a motor in the base end.

20. A robot, comprising:
- a body portion;
- a head portion, wherein the head portion is movable relative to the body portion;
- a right arm portion;
- a left arm portion;
- an annular member connecting the right arm portion and the left arm portion, wherein the annular member is between the body portion and the head portion, and the annular member is configured to rest on a section of the body portion; and
- a flexible outer skin contacting the body portion, the head portion, the right arm portion and the left arm portion, wherein movement of the head portion relative to the body portion is configured to move the flexible outer skin, and the annular member is configured to be displaced with respect to the base portion by movement of the flexible outer skin in response to movement of the head portion.

* * * * *